(12) United States Patent
Kikstra et al.

(10) Patent No.: US 9,694,996 B2
(45) Date of Patent: Jul. 4, 2017

(54) DOCK LEVELER SAFETY SUPPORTS AND RELATED METHODS

(71) Applicants: Leonard Kikstra, Jackson, WI (US); Matthew Sveum, Wauwatosa, WI (US); Norbert Hahn, Franklin, WI (US)

(72) Inventors: Leonard Kikstra, Jackson, WI (US); Matthew Sveum, Wauwatosa, WI (US); Norbert Hahn, Franklin, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 14/679,239

(22) Filed: Apr. 6, 2015

(65) Prior Publication Data

US 2016/0289013 A1 Oct. 6, 2016

(51) Int. Cl.
*B65G 69/28* (2006.01)

(52) U.S. Cl.
CPC ...... *B65G 69/2811* (2013.01); *B65G 69/2823* (2013.01); *B65G 69/2876* (2013.01)

(58) Field of Classification Search
CPC ............ B65G 69/2811; B65G 69/2876; B65G 69/2817; B65G 69/2835; B65G 69/2852
USPC ........................................ 14/69.5, 71.1, 71.3
See application file for complete search history.

(56) References Cited

U.S. PATENT DOCUMENTS

| 2,491,870 | A | * | 12/1949 | McLaughlin | .......... B65G 69/30 105/436 |
| 3,781,934 | A | * | 1/1974 | Pink | ...................... B65G 69/30 14/69.5 |
| 4,376,319 | A | | 3/1983 | Bedford | |
| 4,944,062 | A | * | 7/1990 | Walker | ............... B65G 69/2882 14/71.3 |

(Continued)

FOREIGN PATENT DOCUMENTS

GB      948657      2/1964

OTHER PUBLICATIONS

United States Patent and Trademark Office, "Notice of Allowance," issued in connection with U.S. Appl. No. 14/565,064, Mar. 1, 2016, 25 pages.

(Continued)

*Primary Examiner* — Abigail A Risic
(74) *Attorney, Agent, or Firm* — Hanley, Flight & Zimmerman, LLC

(57) ABSTRACT

An example dock leveler with safety supports including a deck having a deck plate, a plurality of support beams, a first side plate and a second side plate. The deck plate has an outer perimeter defined by a front edge, a rear edge, a first lateral edge and a second lateral edge. A first deck obstruction extends underneath the deck plate and is selectively configurable to at least one of a blocking position or a stored position. The first deck obstruction is elongate in a lateral direction and the first deck obstruction has a protruding end. The first side plate is closer to the protruding end when the (Continued)

first deck obstruction is in the stored position than when the first deck obstruction is in the blocking position. The first deck obstruction extends laterally beyond the deck width when the deck obstruction is in the blocking position. The first deck obstruction includes a pulling enhancement at the protruding end.

31 Claims, 15 Drawing Sheets

(56) References Cited

U.S. PATENT DOCUMENTS

| | | | | |
|---|---|---|---|---|
| 5,001,799 | A | * | 3/1991 | Alexander ......... B65G 69/2876 14/71.1 |
| 5,440,772 | A | * | 8/1995 | Springer ............ B65G 69/2882 14/69.5 |
| 5,481,774 | A | | 1/1996 | Hodges et al. |
| 5,546,623 | A | | 8/1996 | Hahn |
| 5,600,859 | A | | 2/1997 | Hodges et al. |
| 5,651,155 | A | | 7/1997 | Hodges et al. |
| 5,996,156 | A | | 12/1999 | Massey |
| 6,035,475 | A | | 3/2000 | Alexander |
| 6,205,606 | B1 | | 3/2001 | Zibella et al. |
| 6,216,303 | B1 | | 4/2001 | Massey |
| 9,546,056 | B2 | | 1/2017 | Stone et al. |
| 2005/0251933 | A1 | | 11/2005 | Mitchell et al. |
| 2015/0040329 | A1 | | 2/2015 | Palmersheim |
| 2016/0159587 | A1 | | 6/2016 | Stone et al. |

OTHER PUBLICATIONS

Australian Patent Office, "Patent Examination Report No. 1", issued in connection with Australian Patent application No. 2015261625, issued on May 6, 2016, 9 pages.
European Patent Office, "Extended Search Report", issued in connection with European patent application No. 15003509.5, May 10, 2016, 9 pages.
United States Patent and Trademark Office, "Notice of Allowance", issued in connection with U.S. Appl. No. 15/189,933, Aug. 31, 2016, 24 pages.
Rite-Hite Holding Corporation, "Photo of Manually Installed Leveler Stops," dated Nov. 4, 2014, 1 page.
Australian Patent Office, "Patent Examination Report No. 2", issued in connection with Australian patent application No. 2015261625, Aug. 12, 2016, 3 pages.
European Patent Office, "Communication pursuant to Rule 69 EPC", issued in connection with European patent application No. 15003509.5, Jun. 20, 2016, 2 pages.
Australian Patent Office, "Notice of Acceptance", issued in connection with Australian Patent Application No. 2015261625, Oct. 24, 2016, 2 pages.
Canadian Patent Office, "Office Action", issued in connection with Canadian Patent Application No. 2913345, Oct. 11, 2016, 5 pages.
Australian Patent Office, "Certificate of Grant", issued in connection with Australian Patent Application No. 2015261625, Feb. 16, 2017, 1 page.
European Patent Office, "Communication under Rule 71(3) EPC," issued in connection with European Patent Application No. 15003509.5, dated Mar. 30, 2017, 7 pages.

* cited by examiner

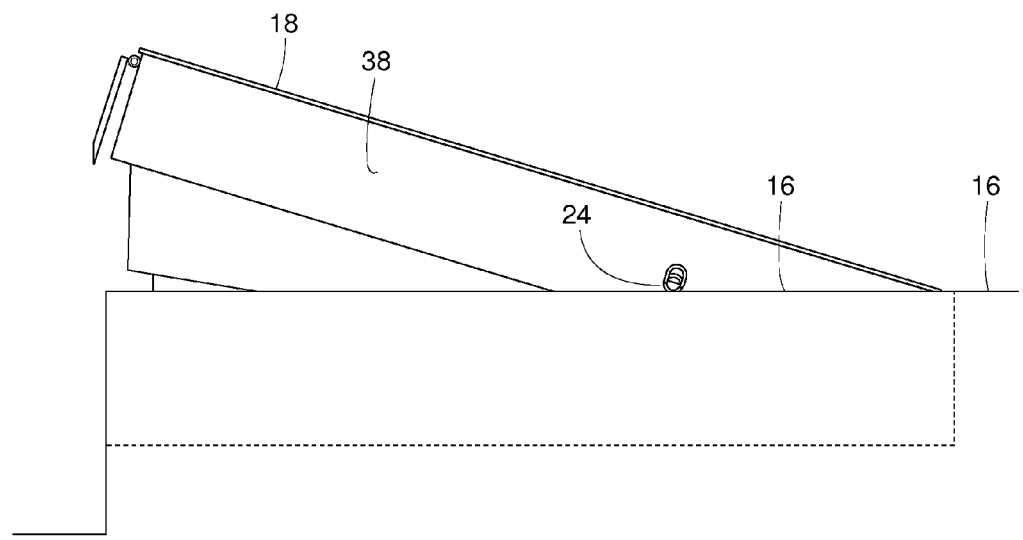
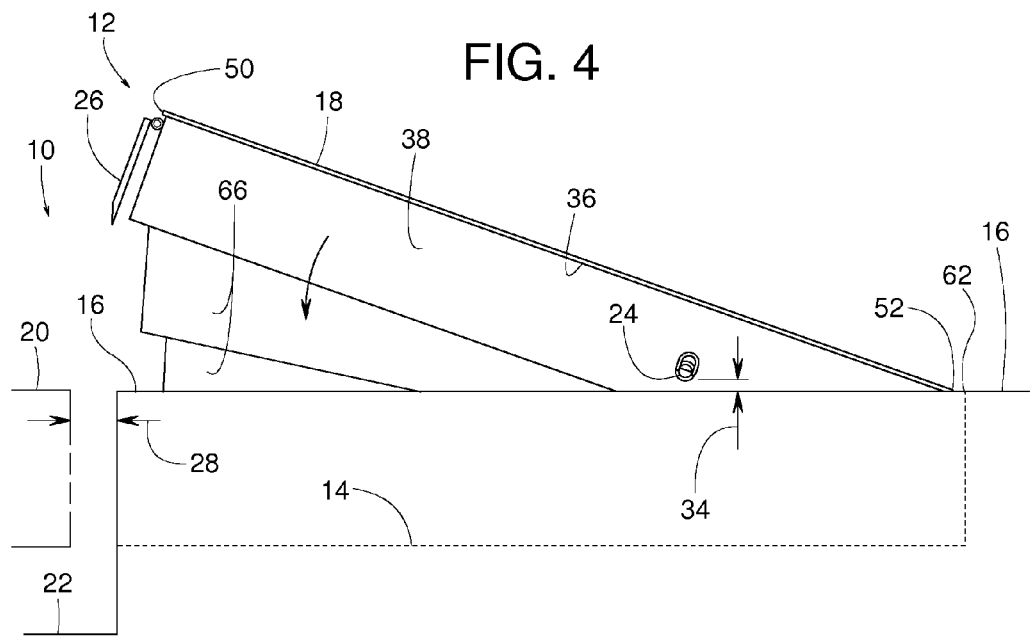

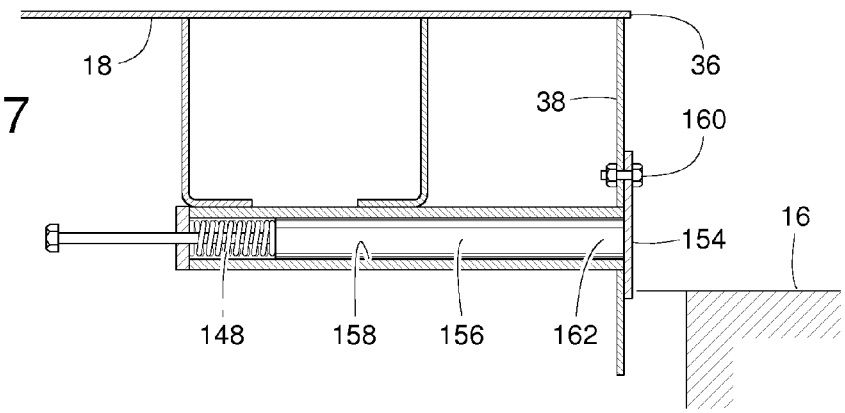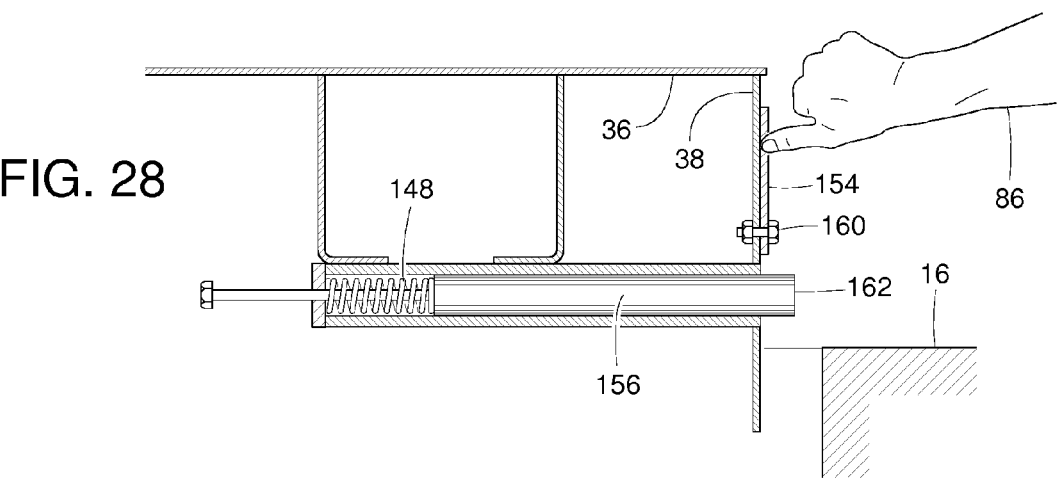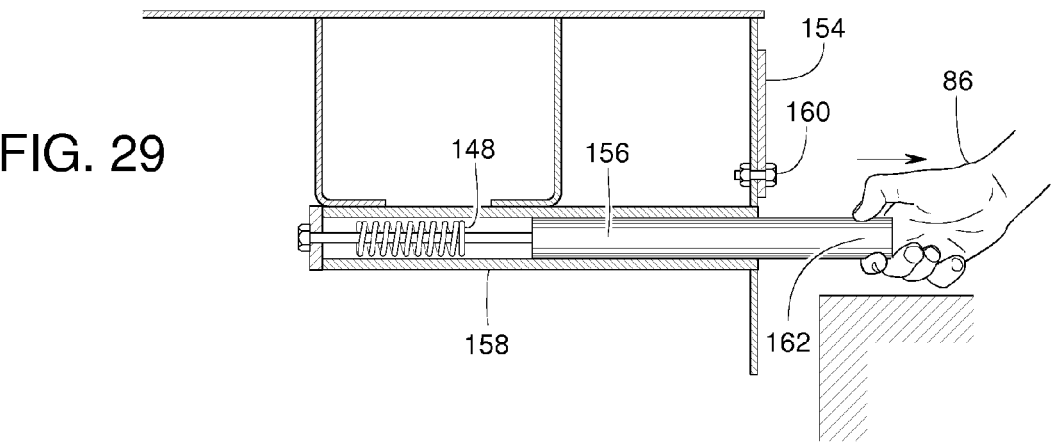

US 9,694,996 B2

DOCK LEVELER SAFETY SUPPORTS AND RELATED METHODS

FIELD OF THE DISCLOSURE

This patent generally pertains to dock levelers and, more specifically, to dock leveler safety supports and related methods.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along its back edge to vary the height of its front edge. A retractable extension plate or lip pivots or translates outward from the deck's front edge to span the gap between the rear of the truck bed and the front edge of the deck. Thus, the deck and lip provide a bridge between the dock's platform and the vehicle's bed so that personnel and material handling equipment can readily move on and off the vehicle during loading and unloading operations.

Many dock levelers have a pit in which the deck can descend to a cross-traffic position where the upper surface of the deck is generally flush with the platform. Some pits underneath the deck contain power actuators and other mechanisms for operating the dock leveler. To gain access to such mechanisms for maintenance, cleaning or other service operations, it might be necessary to fully raise the deck above the cross-traffic position. For safety, the raised deck should be securely braced before working underneath it. An example for bracing a deck in a raised position is disclosed in U.S. Pat. No. 5,546,623, which is specifically incorporated herein by reference.

BRIEF DESCRIPTION OF THE DRAWINGS

FIG. 3 is a side view showing the example dock leveler of FIGS. 1 and 2.

FIG. 4 is a side view similar to FIG. 3 but showing a deck of the example dock leveler of FIGS. 1-3 at a first raised position.

FIG. 27 is a cross-sectional view similar to FIG. 24 but showing another example dock leveler having another example deck obstruction constructed in accordance with the teachings disclosed herein.

FIG. 28 is a cross-sectional view similar to FIG. 27 but showing the deck obstruction of the example dock leveler of FIG. 27 in a released position.

FIG. 29 is a cross-sectional view similar to FIGS. 27 and 28 but showing the deck obstruction of the example dock leveler of FIGS. 27 and 28 in a blocking position.

DETAILED DESCRIPTION

To maintain, clean or otherwise service a pit area underneath the deck of a dock leveler, some example dock levelers include one or more deck obstructions that can be deployed (e.g., manually) to secure a deck of a dock leveler in a raised position to provide safe access to the underside of the deck. In some examples, the example deck obstructions disclosed herein extend beyond the sides of the deck to provide a visual notification and/or warning that the dock leveler is in a service state. In some examples, a linkage assembly disclosed herein couples two or more deck obstructions such that operation of one deck obstruction causes operation and/or movement of another deck obstruction coupled via the linkage assembly. For example, when one of the deck obstructions is extended or retracted, the other ones of the deck obstructions also extend or retract (e.g., simultaneously and/or in unison).

Figure 1:
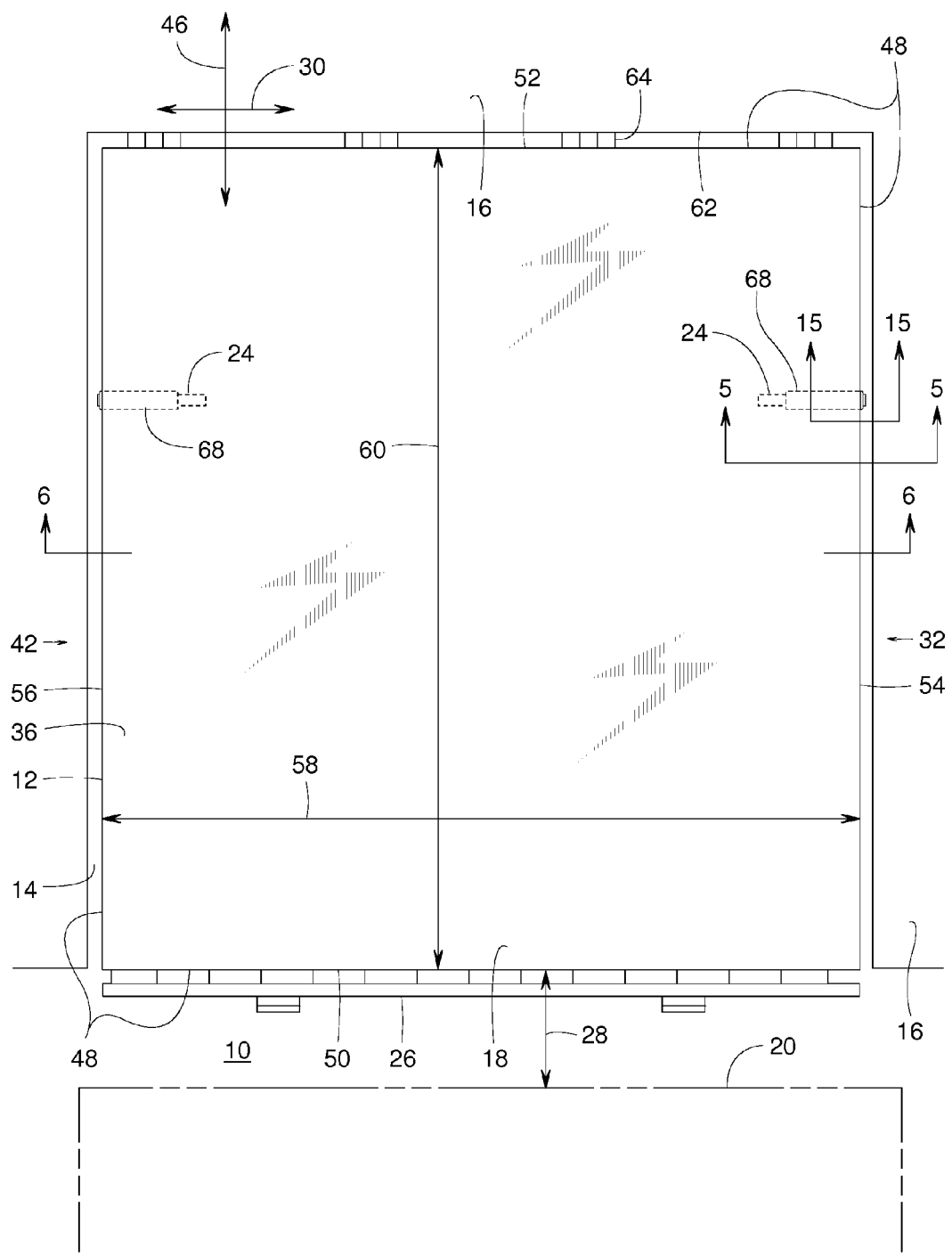
FIG. 1 is a top view of an example dock leveler having example deck obstructions constructed in accordance with the teachings disclosed herein.
Figure 2:
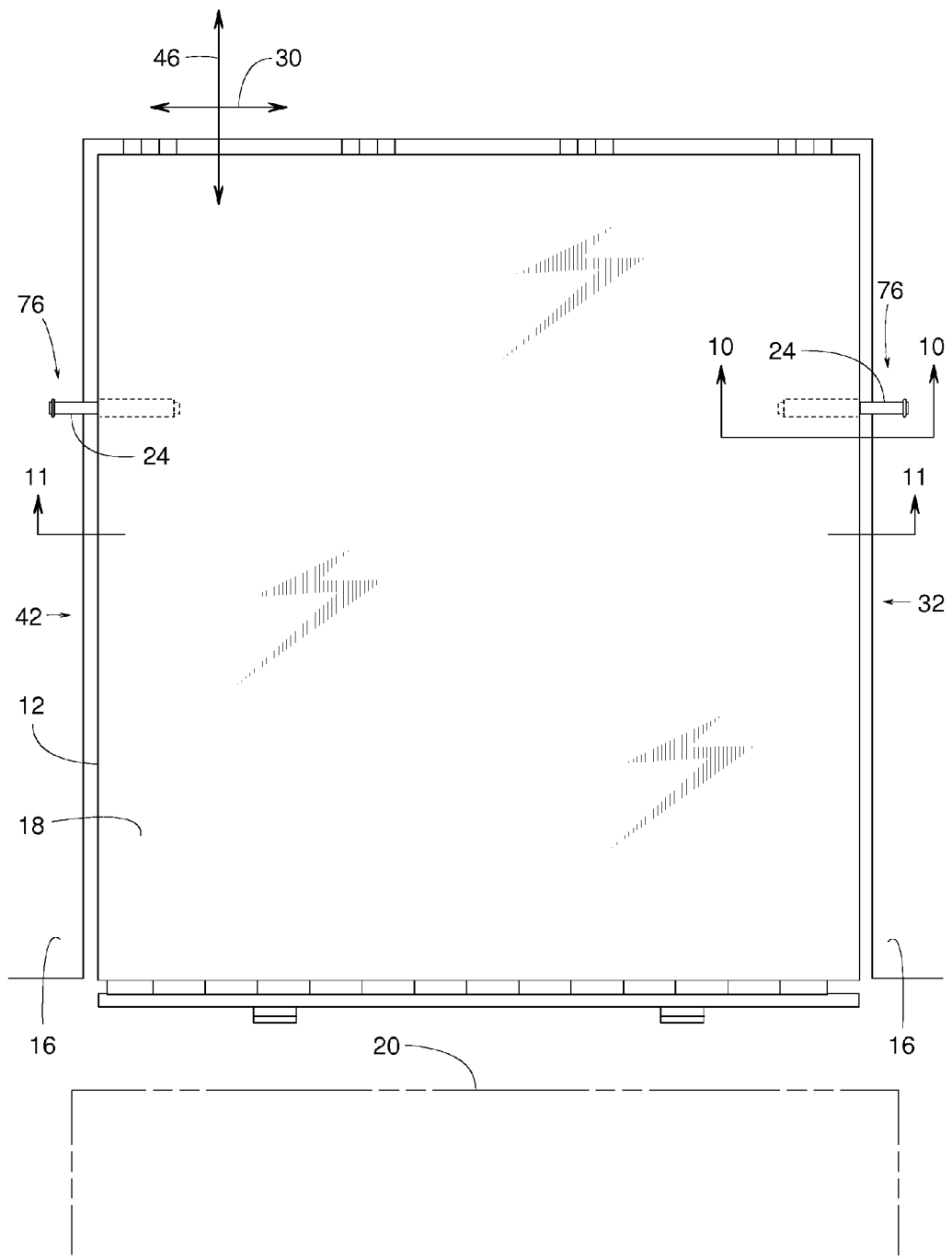
FIG. 2 is a top view similar to FIG. 2 but showing the example deck obstructions of the example dock leveler of FIG. 1 in a blocking position.

FIGS. 1-4 show a loading dock 10 having an example dock leveler 12 installed within a pit 14 that is partially surrounded by a platform 16. The dock leveler 12 includes a pivotal deck 18 that provides or serves as an adjustable ramp for facilitating transfer of cargo between the platform 16 and a vehicle 20 parked on a driveway 22 of the dock 10. The dock leveler 12 of the illustrated example includes an example deck obstruction 24 (e.g., one or more deck obstructions 24) movable (e.g., manually movable) between a stored position (e.g., a position as shown in FIG. 1) during normal dock leveler operation and a blocking position (e.g., a position as shown in FIG. 2) to secure or lock the deck 18 during servicing operations (e.g., inspection, cleaning, maintenance, etc.).

During normal operation, the deck 18 can be raised or lowered by any known means or actuation devices. Examples of such devices include, but are not limited to, a hydraulic cylinder, a pneumatic cylinder, a helical spring, a pneumatic spring, a hydraulic motor, a pneumatic motor, an electric motor (e.g., a linear motor), an inflatable diaphragm, manual force, gravity and/or various combinations thereof. In some examples, a lip 26 coupled to the deck 18 can extend (also by any known means) to bridge a gap 28 between the vehicle 20 and the deck 18.

For servicing operations, the deck obstruction 24 is (e.g., manually) deployed to the blocking position to brace the deck 18 at a fixed elevated position, as shown in FIG. 3. Bracing the deck 18 via the deck obstruction 24 provides service workers with safe access to the underside of the deck 18 by preventing further movement of the deck 18 toward the lowered position and/or in a direction toward the pit 14. When deployed, the deck obstruction 24 of the illustrated example protrudes in a lateral direction 30 (e.g., as shown in FIG. 2) from a first side 32 of the deck 18 and extends out and over a perimeter of the platform 16 to rest upon or otherwise engage the platform 16. In order for deck obstruction 24 to readily extend or retract without frictional drag or interference from the platform 16, the deck 18 is raised, for example, to the position shown in FIG. 4. At the elevation shown in FIG. 4, the deck obstruction 24 is appreciably above or spaced from the platform 16 to provide a (e.g., vertical) clearance 34 between the deck obstruction 24 and the platform 16. After manually extending or moving the deck obstruction 24 to the extended, deployed or blocking position, the deck 18 is lowered toward the pit 14 until the deck obstruction 24 engages a surface (e.g., an upper or top surface or a corner) of the platform 16 as shown, for example, in FIG. 3. Deck obstruction 24 resting upon platform 16 allows platform 16 to support the deck 18 without having to rely on the actuation device of the dock leveler.

In the illustrated example, the deck 18 includes a top deck plate 36, a first side plate 38 at first side 32 of the deck 18, a second side plate 40 at a second side 42 of the deck 18, and a plurality of support beams 44 underneath the deck plate 36. The support beams 44 are elongate in a longitudinal direction 46, where the longitudinal direction in the orientation of FIGS. 1-4 is substantially coplanar with the deck plate 36 and substantially perpendicular relative to the lateral direction 30. The deck plate 18 of the illustrated example has an outer perimeter 48 defined by a front edge 50, a rear edge 52, a first lateral edge 54 and a second lateral edge 56. The deck plate 36 has a deck width 58 as measured in the lateral direction 30 and has a deck length 60 as measured in the longitudinal direction 46. The front edge 50 extends in the lateral direction 30 and is (e.g., vertically) movable relative to platform 16 to adjust an elevation and/or an inclination angle of the deck 18 relative to (e.g., a horizontal surface of) the platform 16. The deck plate's rear edge 52 of the illustrated example extends in the lateral direction 30 and is proximate the platform 16 at the upper rear edge 62 of the pit 14. The term, "proximate" as it refers to the deck plate's rear edge 52 and the platform 16 means that the rear edge 52 and the platform 16 are within approximately 24 inches of each other. In some examples, a hinge 64 at the deck plate's rear edge 52 enables the deck 18 to pivotally raise and lower the deck's front edge 50. The deck plate's first lateral edge 54 and second lateral edge 56 of the illustrated example extend in the longitudinal direction 60 between the deck plate's front edge 50 and rear edge 52. The deck plate's first lateral edge 54 and the second lateral edge 56 of the illustrated example are substantially parallel to the longitudinal direction 46. The first side plate 38 is proximate the deck plate's first lateral edge 54 and is elongate in the longitudinal direction 46. The second side plate 40 is proximate the second lateral edge 56 and is elongate in the longitudinal direction 46. The term, "proximate" as it refers to the distance between a side plate and a lateral edge means that the side plate and the lateral edge are within approximately six inches of each other. The plurality of support beams 44 underneath deck plate 36 are interposed between the side plates 38 and 40. In some examples, the side plates 38 and 40 are referred to as "toe guards." In some examples, the toe guard feature of the dock leveler 12 is extended by adding additional toe guard sections 66.

In the examples illustrated in FIGS. 5-16, the deck obstruction 24 includes a guide member 68 to guide movement of the deck obstruction 24 between the stored and blocking positions. Examples of the guide member 68 include, but are not limited to, a tube, a channel, and a track. In some examples, the guide member 68 is a cylindrical tube welded and/or otherwise attached to or formed with the underside of the deck 18. In the example illustrated of FIG. 5, the guide member 68 is welded to one of the support beams 44, welded to a rectangular reinforcement plate 70, and welded to the first side plate 38. The first side plate 38 has a hole to receive at least a portion of the guide member 68 and/or the deck obstruction 24.

In the illustrated example, the deck obstruction 24 is a solid cylinder that slides or moves in the lateral direction 30 within guide member 68. In some examples, the deck obstruction 24 includes an anti-rotation feature 72, a lock-receiving hole 74, and a protruding end 76. Some examples of the protruding end 76 include a pulling enhancement 78 and a lower tapered surface 80.

To ensure a proper orientation of the lower tapered surface 80 (reasons explained later with reference to FIGS. 12-16), the anti-rotation feature 72 of the illustrated example eliminates and/or at least limits the deck obstruction's freedom of rotation within guide member 68. In other words, the anti-rotation feature 72 prevents or restricts rotation of the deck obstruction 24 relative to the guide member 68. In some examples, the anti-rotation feature 72 is a pin-and-slot interface, where a pin 82 protruding radially from the deck obstruction 24 engages, extends into and/or slides along a lateral slot 84 in the guide member 68. The term, "pin-and-slot interface," refers to any assembly having one member (e.g., a pin, a key, a protrusion, etc.) being confined to translation within an elongate member or feature (e.g., a slot, a channel, track, etc.).

Figure 10:
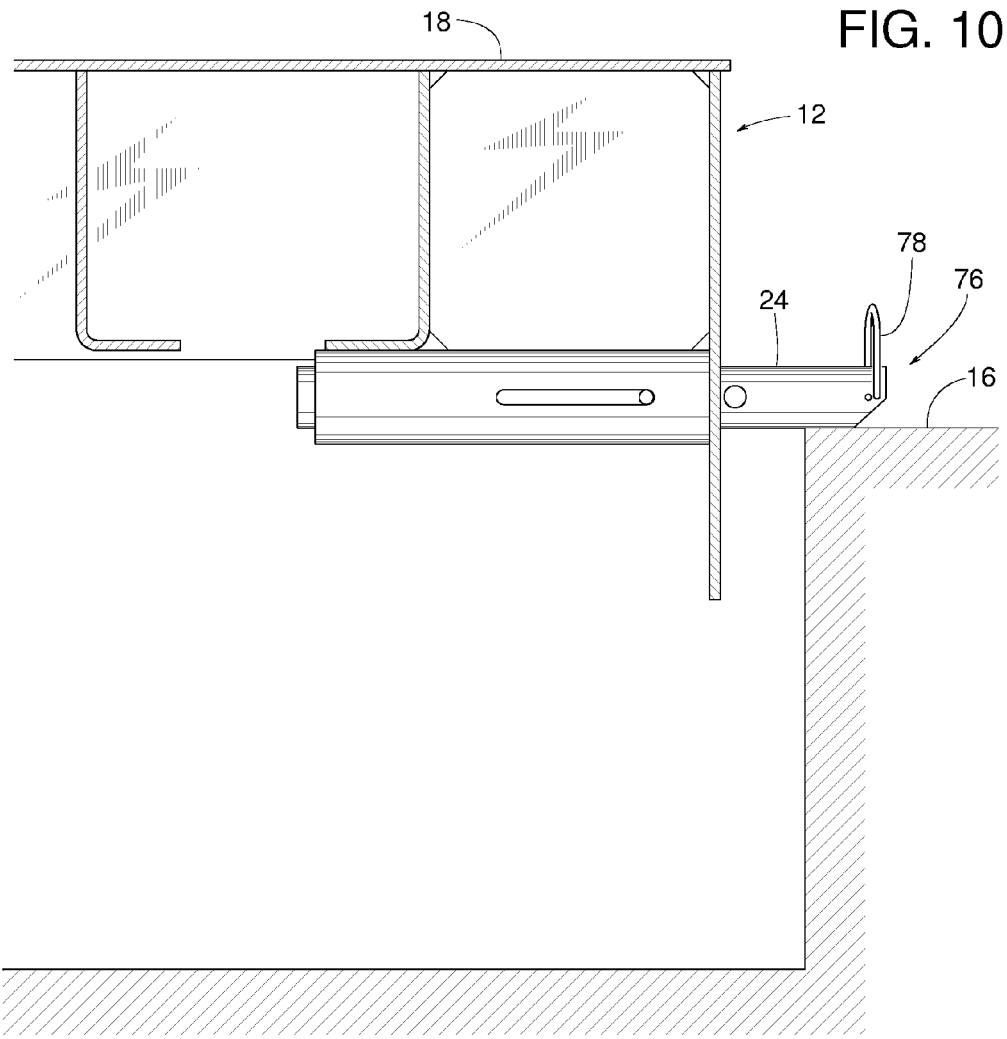
FIG. 10 is a cross-sectional view taken along line 10-10 of FIG. 2.
Figure 11:
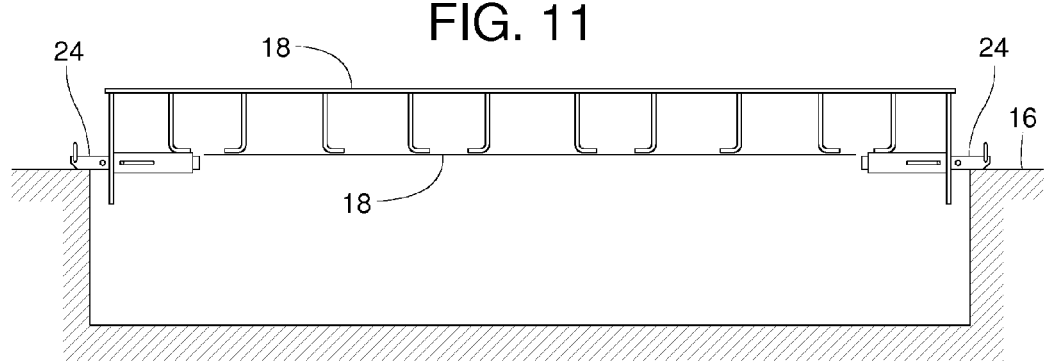
FIG. 11 is a cross-sectional view taken along line 11-11 of FIG. 2.

The lock-receiving hole 74 of the illustrated example enables safely lockout of the dock leveler 12 during servicing operations. When the deck obstruction 24 is extended (e.g., manually) to the blocking position (e.g., as shown in FIGS. 3 and 10), a service worker 86 can insert into the hole 74 the shackle or shank of a padlock or some other locking device to prevent the deck obstruction 24 from retracting to the stored position.

Figure 8:
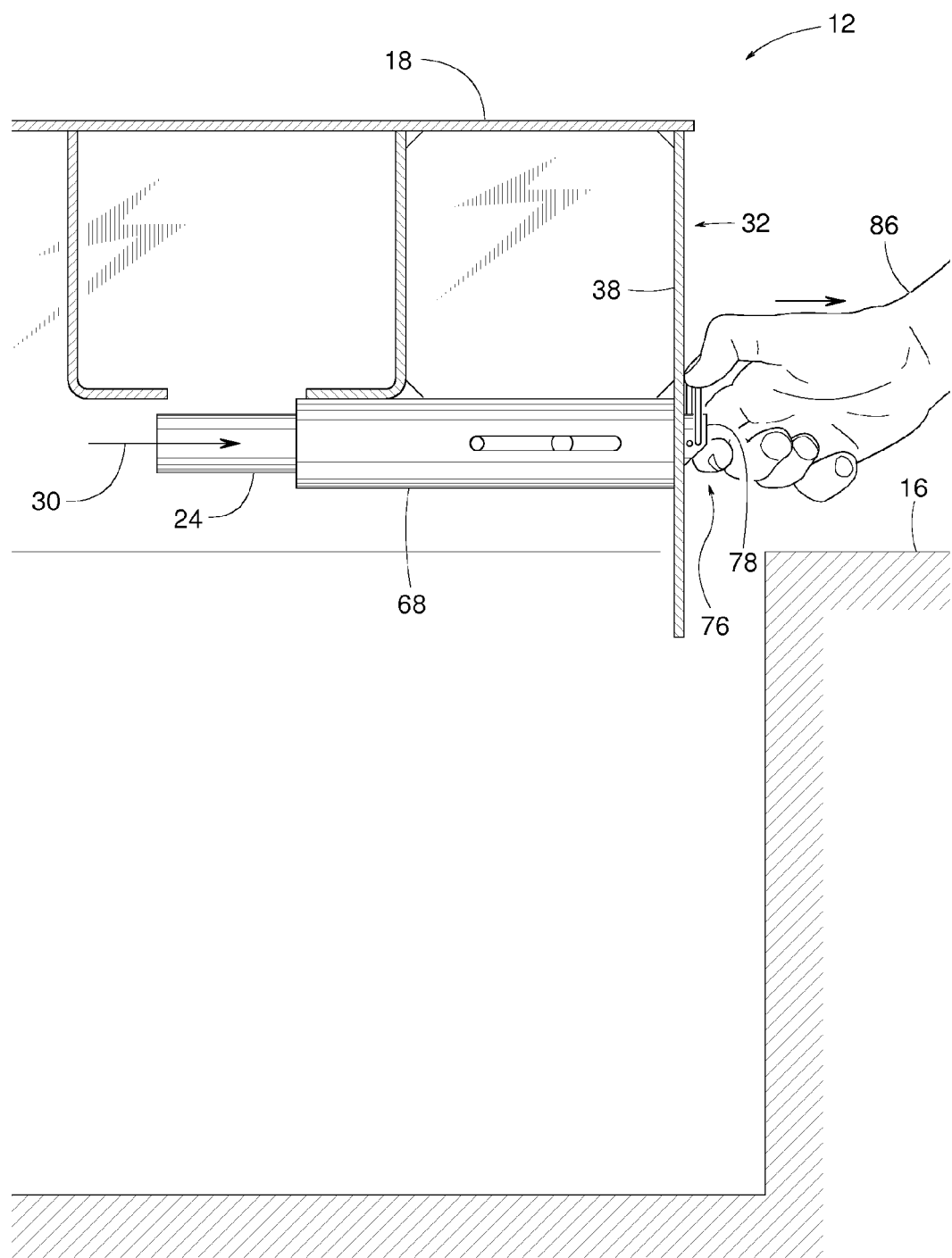
FIG. 8 is a cross-sectional view similar to FIGS. 5 and 6 but showing the deck obstruction removed from the example dock leveler of FIGS. 1-7.
Figure 26:
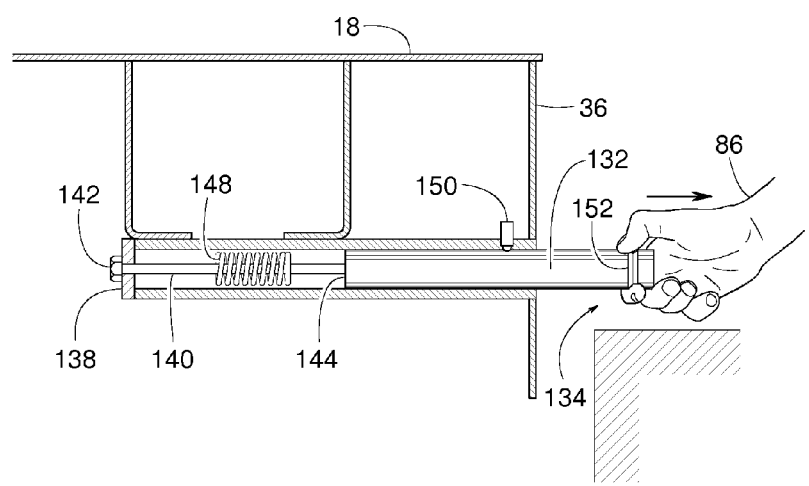
FIG. 26 is a cross-sectional view similar to FIGS. 24 and 25 but showing the deck obstruction of the example dock leveler of FIGS. 24 and 25 in an extended position.

In some examples, the deck obstruction's pulling enhancement 78 is a split D-ring 78*a* attached to the deck obstruction's protruding end 76. The term, "pulling enhancement," refers to any structural feature of an item that facilitates (e.g., manually) gripping and/or pulling (e.g., by a finger or by hand), whereas otherwise gripping or pulling the item without the pulling enhancement would be more difficult. Examples of a pulling enhancement include, but are not limited to, a ring, a hook, a loop, a knurled surface, a concavity, a protuberance, a knob, a groove, etc. FIG. 8 illustrates the service worker 86 using the pulling enhancement 78 to manually pull the deck obstruction 24 from the stored position to the blocking position. FIG. 26 shows another example of the pulling enhancement 78.

Figure 5:
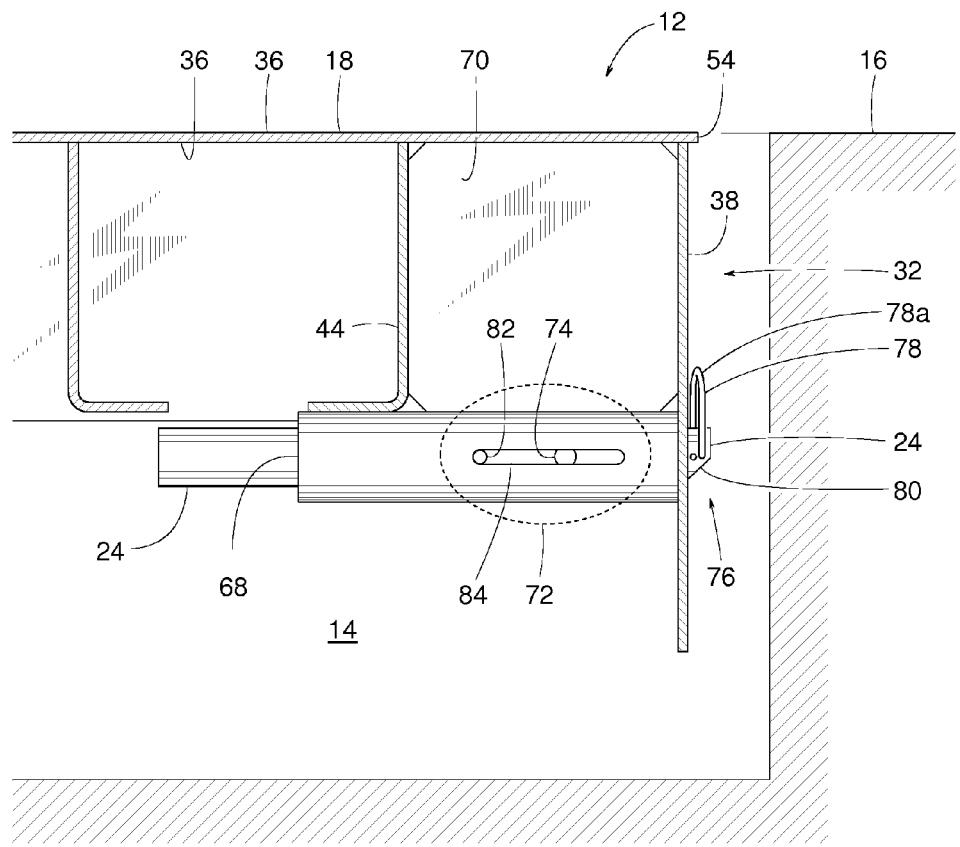
FIG. 5 is a cross-sectional view taken along line 5-5 of FIG. 1.
Figure 6:
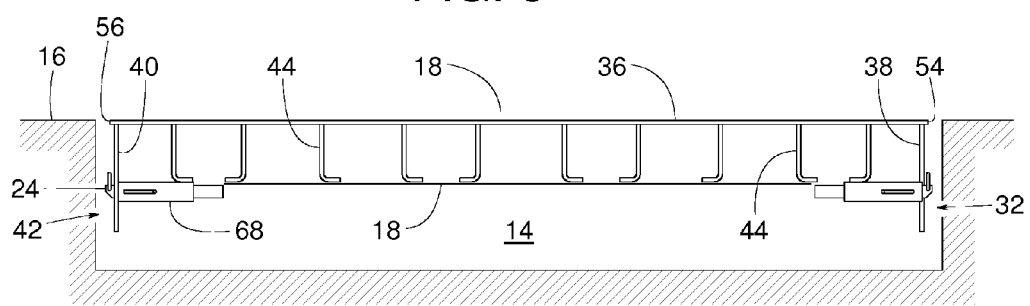
FIG. 6 is a cross-sectional view taken along line 6-6 of FIG. 1

One example method of using the deck obstruction 24 is illustrated sequentially in FIGS. 5 & 6, FIG. 7, FIG. 8, FIG. 9, and FIGS. 10 & 11. FIGS. 5 and 6 show the deck plate 36 generally flush or aligned with platform 16. The deck obstruction 24 is shown in the stored position to allow normal operation of the dock leveler 12 (e.g., movement of the deck 18 between a fully raised position and a fully lowered position).

Figure 7:
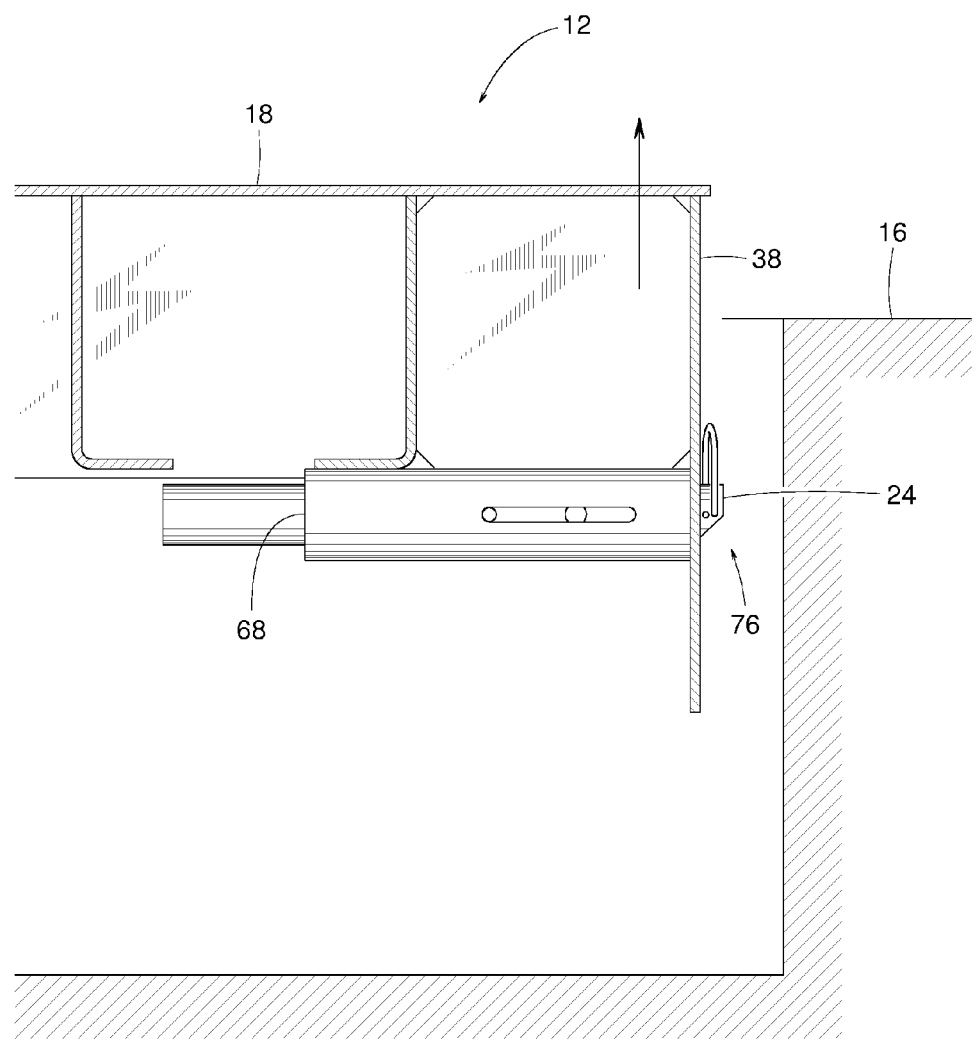
FIG. 7 is a cross-sectional view similar to FIG. 5 but showing the deck of the example dock leveler of FIGS. 1-6 in another raised position.

To configure the dock leveler 12 for servicing operation, the deck 18 is raised as shown, for example, in FIG. 7. For example, the deck 18 is raised until the deck obstruction 24 is appreciably above or spaced from (e.g., vertically spaced from) the platform 16 as shown, for example, in FIG. 8.

FIG. 8 shows service the worker 86 manually pulling the deck obstruction 24 in the lateral direction 30 so that the deck obstruction's protruding end 76 moves away from the deck's side 32 and the side plate 38. The worker 86 pulls the deck obstruction 24 in the lateral direction 30 until the protruding end 76 extends out over the platform 16 as shown, for example, in FIG. 9.

Figure 9:
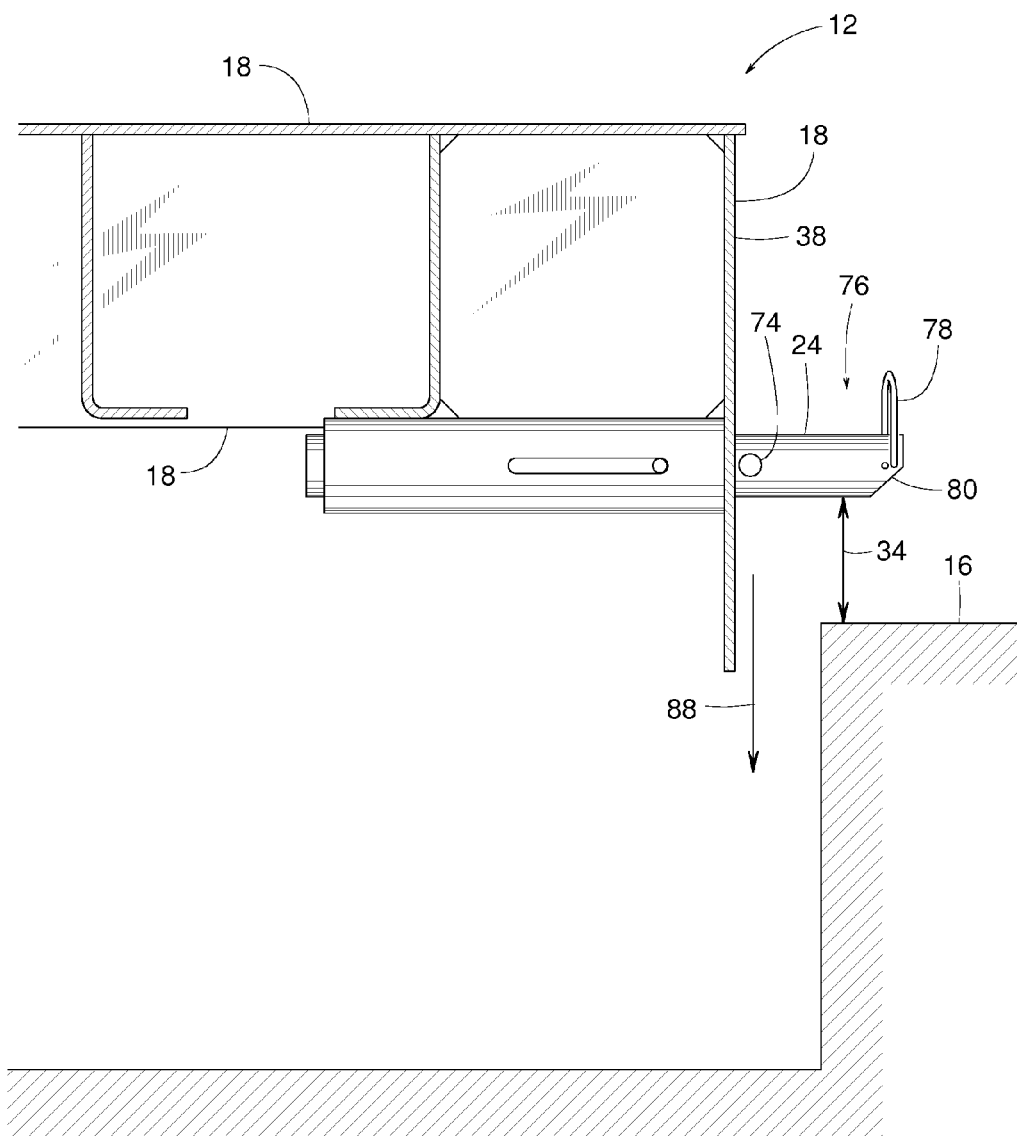
FIG. 9 is a cross-sectional view similar to FIGS. 5, 7 and 8, but showing the deck obstruction of the example dock leveler of FIGS. 1-8 in an extended position.

Arrow 88 in FIG. 9 represents a direction of travel of the deck 18 when the deck 18 is lowered toward the pit 14. The deck 18 is lowered until the deck obstruction 24 engages or rests on the platform 16 as shown, for example, in FIGS. 10 and 11. In the example shown in FIGS. 10 and 11, a significant portion (e.g., almost an entire length) of the deck obstruction 24 is in engagement with an upper surface of the platform 16. When the deck obstruction 24 engages or rests on the platform 16, the deck 18 is supported securely for servicing operations. For additional support, some examples of the dock leveler 12 include a second deck obstruction 24 installed at the deck's opposite side 42. In some such examples, both deck obstructions 24 function in a similar manner but at opposite sides (e.g., sides 32 and 42) of the deck 18. To return the dock lever 12 back to normal operation, the deck 18 is first raised at least a distance away from the platform 16 (e.g. opposite the direction of arrow 88) to lift or move the deck obstruction 24 off of platform 16. When a vertical clearance 34 is provided between the deck obstruction 24 and the platform 16, the worker 86 manually pushes the deck obstruction 24 to the stored position.

Figure 12:
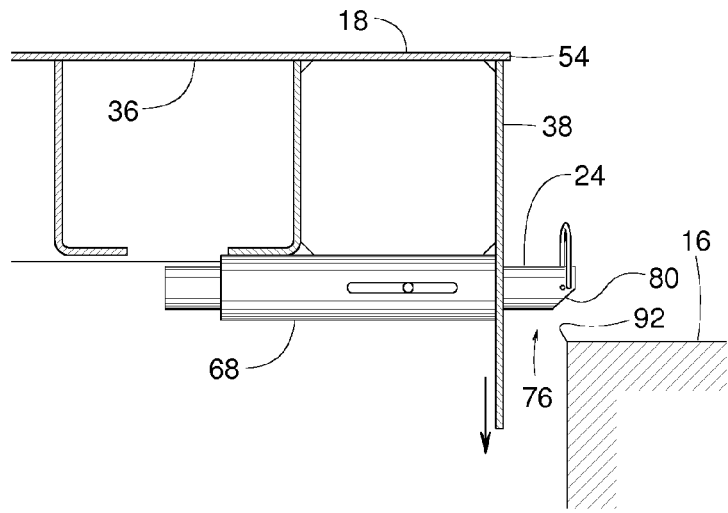
FIG. 12 is a cross-sectional view similar to FIG. 9 but showing the deck obstruction of the example dock leveler of FIGS. 1-11 in a partially extended position.
Figure 13:
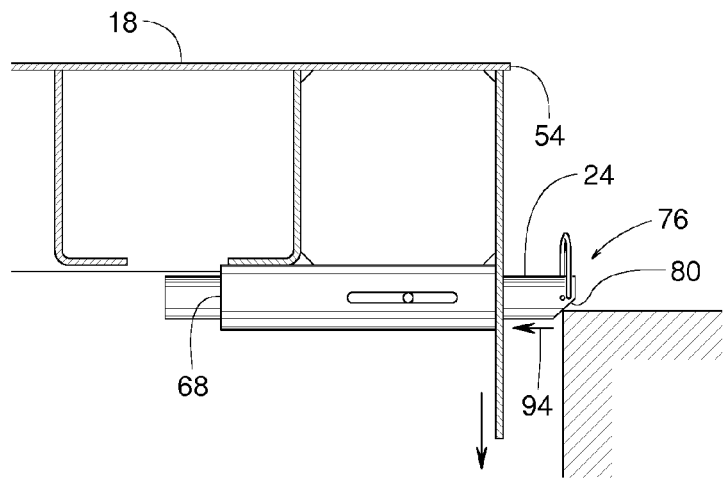
FIG. 13 is a cross-sectional view similar to FIG. 13 but showing the deck obstruction of the example dock leveler of FIGS. 1-12 prior to having encountered an upper side edge of a platform.
Figure 14:
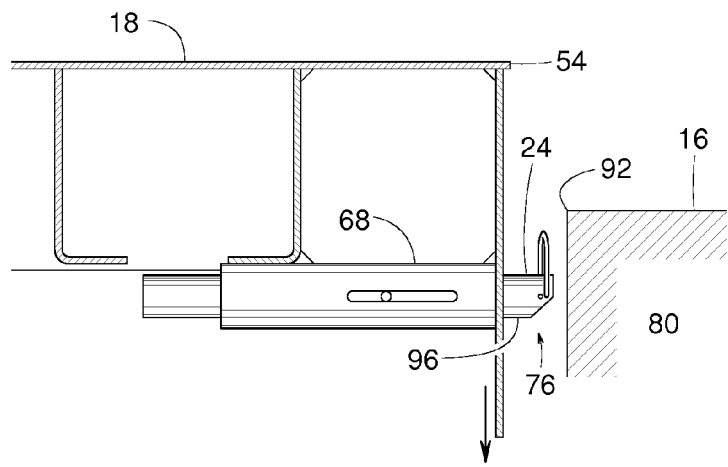
FIG. 14 is a cross-sectional view similar to FIGS. 12 and 13 but showing the deck obstruction of the example dock leveler of FIGS. 1-13 after having had encountered the edge of the platform.
Figure 15:
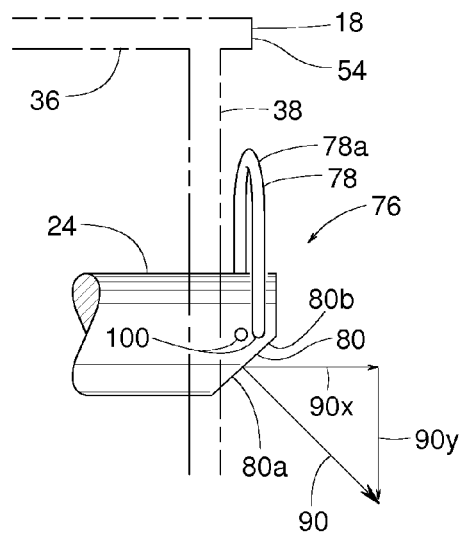
FIG. 15 is a cross-sectional view taken along line 15-15 of FIG. 1.
Figure 16:
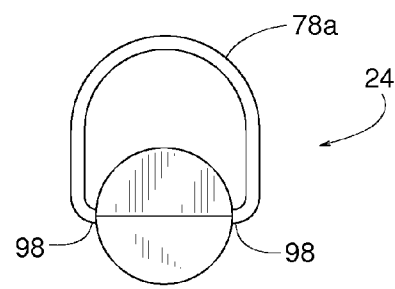
FIG. 16 is a right end view of FIG. 15.

Referring to FIGS. 12-16, in some cases, vibration of the deck 18 during normal operation might cause the deck obstruction 24 to migrate laterally outward (e.g., toward the deployed or extended position). To prevent such migration, the tapered surface 80 at the protruding end 76 is oriented or faces in a direction 90 toward the pit 14 (e.g., a downwardly direction in the orientation of FIG. 15). For example, due to the tapered surface 80 being tapered, the direction 90 has both a laterally outward vector component 90*x* and a downward vector component 90*y*. Additionally, the surface 80 of the illustrated example is tapered or at an angle provides the protruding end 76 with a cam surface so that if the deck 18 descends while deck obstruction 24 is extended slightly over the side edge 92 of platform 16 (e.g., as shown in FIG. 12), the surface 80 encounters or engages the side edge 92. When the surface 80 engages the side edge 92, continued relative motion between the deck 18 and the platform 16 (e.g., in the direction of arrow 88) forces or causes the deck obstruction 24 to retract toward the stored position via the tapered surface 80, as indicated by arrow 94 in FIG. 13. FIG. 14 shows the deck obstruction 24 having been pushed or moved toward the stored position by the side edge 92. To ensure that a (e.g., lower horizontal) surface 96 of the deck obstruction 24 does not catch the platform's side edge 92 when deck obstruction 24 is in the stored position, the deck obstruction 24 of the illustrated example has a first portion 80*a* (e.g., between approximately 20% and 70% of the total length of the tapered surface 80) underneath deck plate 18 and a second portion 80*b* (e.g., between approximately 20% and 70% of the total length of the tapered surface) extending laterally out from underneath the deck plate 18 or away from the side surface 38 of the deck 18 (e.g., as shown in FIG. 15) when the deck obstruction 24 is in a fully extended position or in the blocking position.

The pulling enhancement 78 of the illustrated example can be attached to the deck obstruction 24 by any suitable means or fastener. For instance, in the example shown in FIGS. 15 and 16, two horizontal legs 98 of the D-ring 78*a* fit within a pair of parallel but offset holes 100 formed in the deck obstruction 24. The resulting offset relationship between the legs 98 helps hold the D-ring 78*a* generally upright so as to prevent the D-ring 78*a* from being crushed against platform 16 when the deck obstruction 24 is in the blocking position (e.g., resting atop the platform 16).

Figure 17:
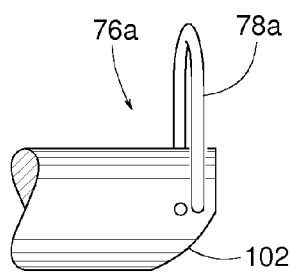
FIG. 17 is a view similar to FIG. 15 but showing another example deck obstruction constructed in accordance with the teachings disclosed herein.
Figure 18:
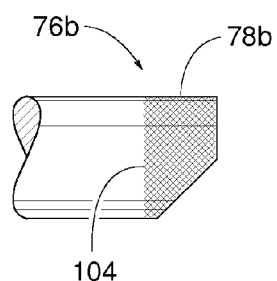
FIG. 18 is view similar to FIG. 17 but showing another example deck obstruction constructed in accordance with the teachings disclosed herein.
Figure 19:
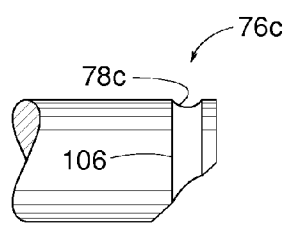
FIG. 19 is view similar to FIG. 17 but showing another example deck obstruction constructed in accordance with the teachings disclosed herein.
Figure 20:
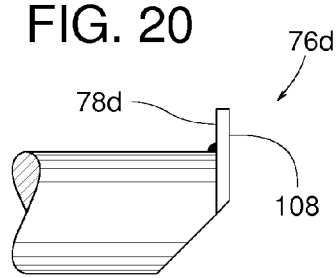
FIG. 20 is view similar to FIG. 17 but showing another example deck obstruction constructed in accordance with the teachings disclosed herein.

FIGS. 17-20 show alternate examples of protruding ends with a tapered bottom and various pulling enhancements. FIG. 17, for instance, shows a protruding end 76*a* having a convex or otherwise curved tapered surface 102 to provide or facilitate surface interaction (e.g., reduce friction) between the tapered surface 102 and the platform's side edge 92. FIG. 18 shows another example deck obstruction having a protruding end 76*b* with a pulling enhancement 78*b* in the form of a knurled surface 104. FIG. 19 shows another example deck obstruction having a protruding end 76*c* with a pulling enhancement 78*c* in the form of a grove 106. FIG. 20 shows another example deck obstruction having a protruding end 76*d* with a pulling enhancement 78*d* in the form of a welded-on tab 108.

Figure 21:
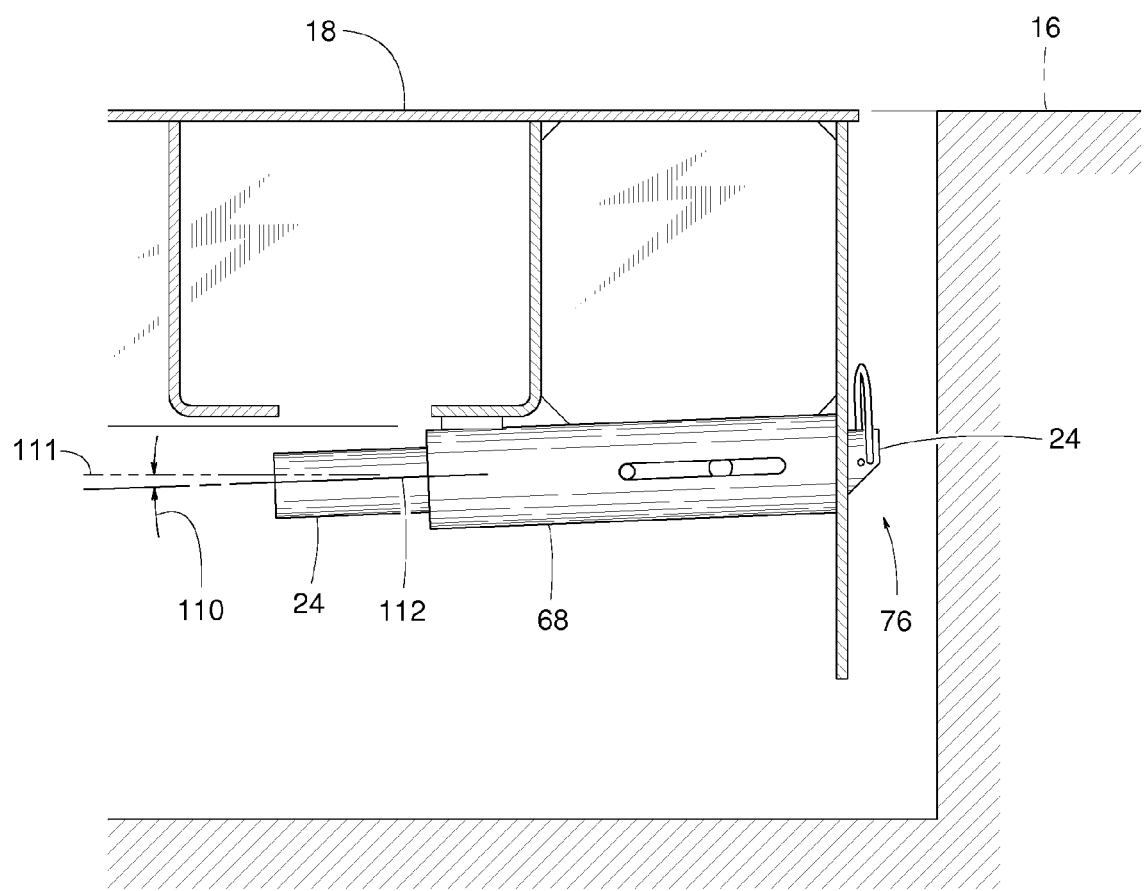
FIG. 21 is a cross-sectional view similar to FIG. 5 but showing another example dock leveler constructed in accordance with the teachings disclosed herein.

To eliminate or minimize the likelihood of vibration causing deck obstruction 24 to migrate laterally outward from the deck plate 18 and/or toward the extended or deployed position, some examples of the deck obstruction 24 are canted or angled relative to the side surface 32 of the deck 18 (e.g., mounted at an angle 110 relative to a horizontal reference 111 as show in FIG. 21). In this manner, a lengthwise centerline 112 of the deck obstruction 24 positioned at a slight incline relative to the horizontal reference 111 elevates the deck obstruction's protruding end 76 (e.g., above the horizontal reference 111). With such an incline (e.g., about 3 degrees or more), normal incidental vibration tends to direct deck obstruction 24 toward the stored position.

Figure 22:
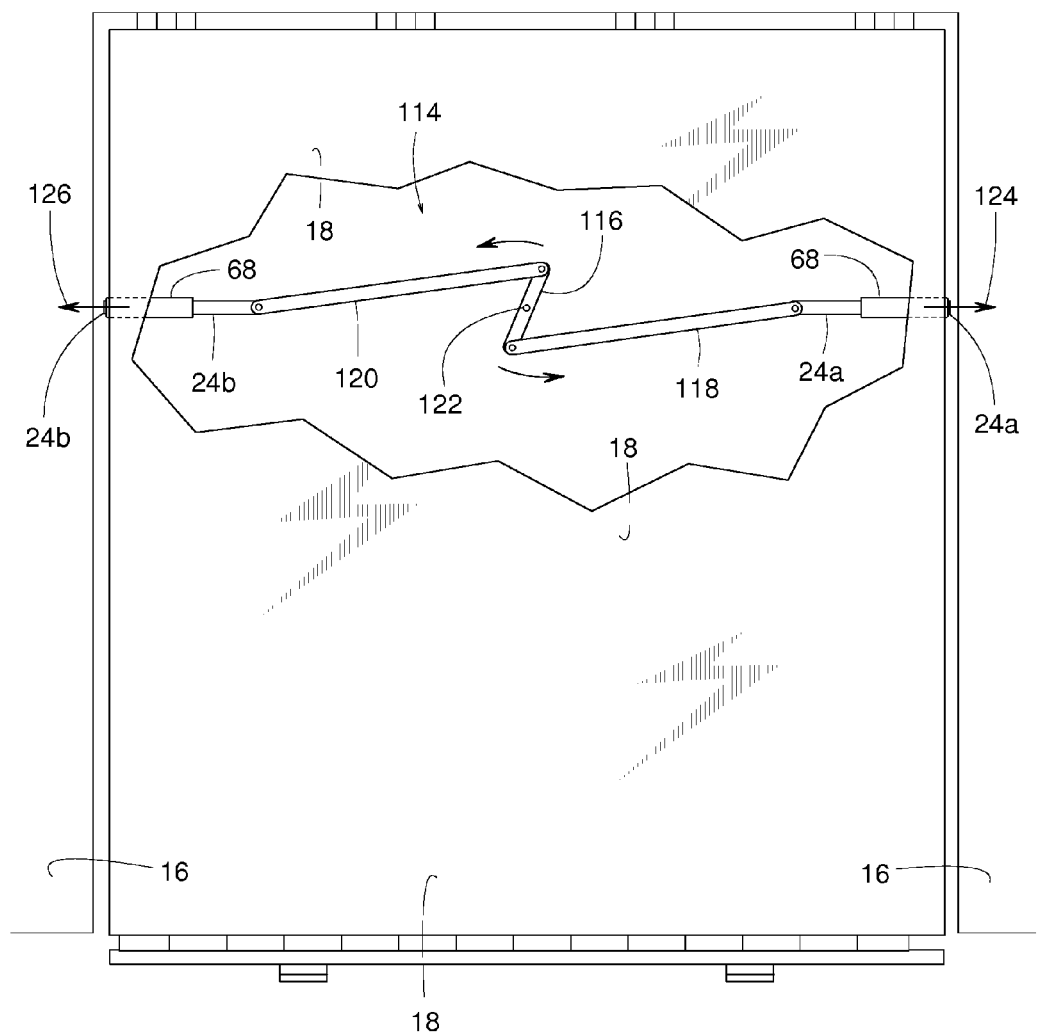
FIG. 22 is a cut-away top view similar to FIG. 1 but showing another example dock leveler constructed in accordance with the teachings disclosed herein.
Figure 23:
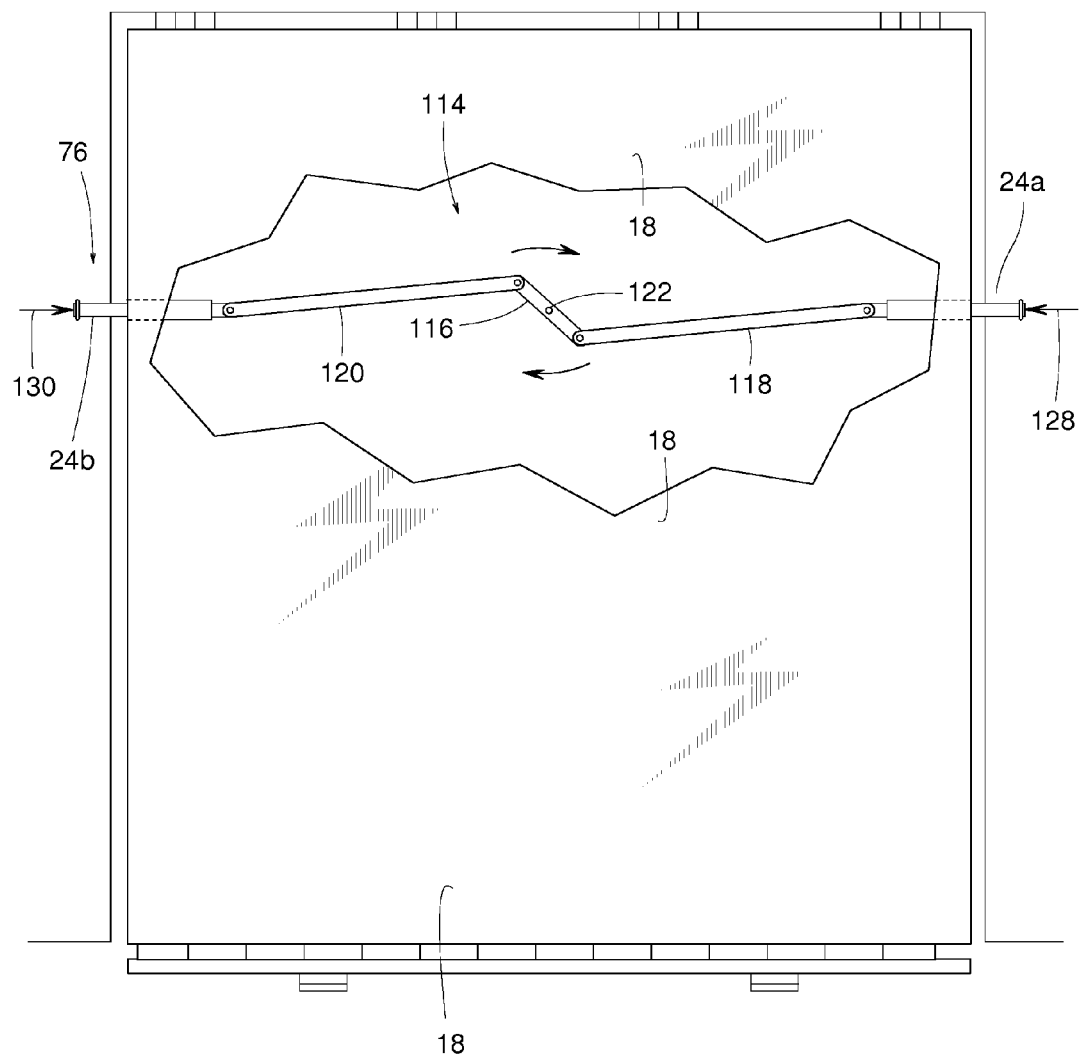
FIG. 23 is a cut-away top view similar to FIG. 22 but showing deck obstructions of the example dock leveler of FIG. 22 in extended positions.

FIGS. 22 and 23 show an example linkage 114 to couple a first deck obstruction 24a and a second deck obstruction 24b. As a result, when the first deck obstruction 24a is (e.g., manually) extended or retracted, the deck obstruction 24b also extends or retracts simultaneously or in unison with the first deck obstruction 24a. For example, when the first deck obstruction 24a is moved to the blocking position, the second deck obstruction 24b also moves to the blocking position via the linkage 114. This ensures that if one deck obstructions 24a or 24b is extended or retracted, the other one of deck obstructions 24a or 24b will not be inadvertently left in the wrong position. Thus, the linkage 114 provides a positional relationship between the first deck obstruction 24a and the second deck obstruction 24b such that relative lateral movement of the first deck obstruction 24a and the second deck obstruction 24b is substantially equal in distance and opposite in direction. In some examples, the linkage 114 includes a rotatable link 116, a first link 118 connecting the first deck obstruction 24a to rotatable link 116, and a second link 120 connecting the second deck obstruction 24b to rotatable link 116. The link 116 is rotatable about a shaft 122 (axis) that is at a fixed position relative to the deck 118. Whenever the first deck obstruction 24a is manually pulled in a direction indicated by arrow 124 of FIG. 22 (e.g., toward the blocking position), tension in the first link 118 rotates the link 116 about the shaft 122. The link's rotation transmits compression to the second link 120, which extends or moves the second deck obstruction 24b in the direction of arrow 126 (e.g., toward the blocking position). Conversely, whenever the first deck obstruction 24a is manually pushed in or moved in a direction indicated by arrow 128 of FIG. 23 (e.g., toward the stored position), compression in the first link 118 rotates the rotating link 116 about the shaft 122. The link's rotation applies tension to the second link 120, which retracts or moves the second deck obstruction 24b in the direction of arrow 130 (e.g., toward the stored position).

Figure 24:
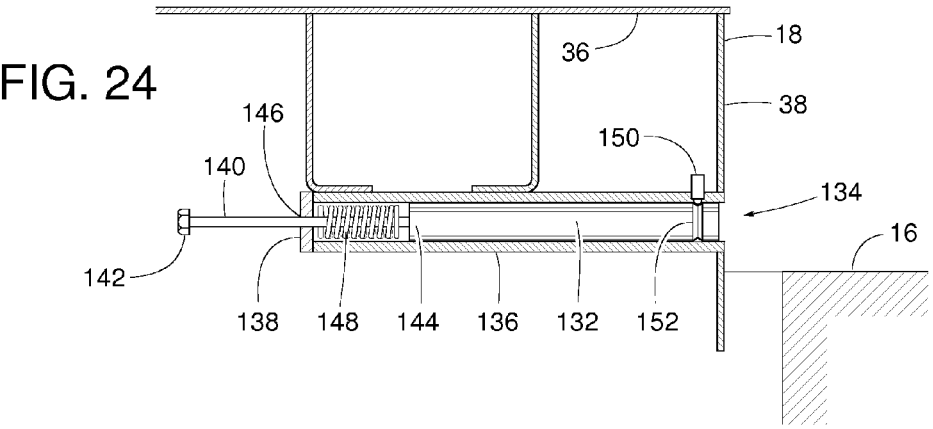
FIG. 24 is a cross-sectional view similar to FIG. 5 but showing another example dock leveler having another example deck obstruction constructed in accordance with the teachings disclosed herein.
Figure 25:
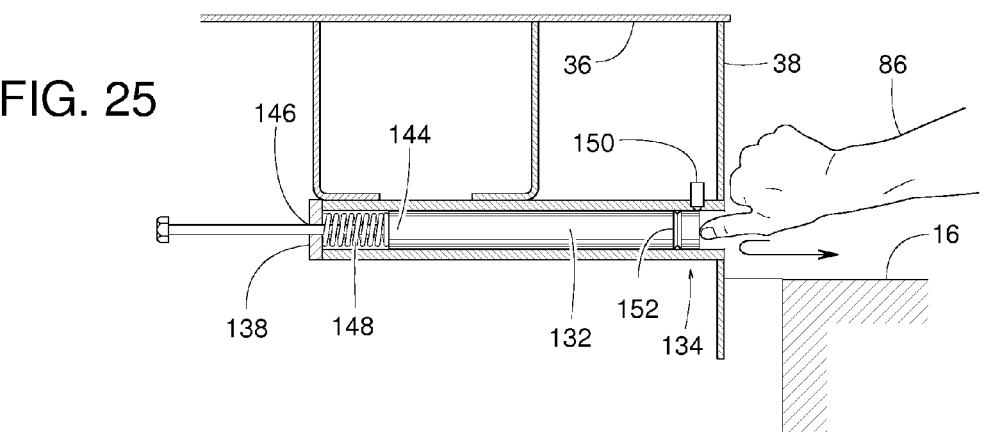
FIG. 25 is a cross-sectional view similar to FIG. 24 but showing a worker manipulating the deck obstruction of the example dock leveler of FIG. 24.

FIGS. 24-26 show an example deck obstruction 132 positioned within a guide member 136. The deck obstruction 132 of the illustrated example has a protruding end 134 that is substantially flush or recessed relative to an opening of the guide member 136 oriented toward the platform 16 when the deck obstruction 132 is in the stored position, as shown in FIG. 24. In this example, the guide member 136 is a tube with an end cap 138. A rod 140 with a head 142 extends from one end 144 of the deck obstruction 132. The rod 140 slides axially through a hole 146 in the end cap 138. A compression spring 148 is situated within the guide member 136, between the end cap 138 and the end 144 of the deck obstruction 132.

In some examples, a spring-loaded ball plunger 150 extends through a side of the guide member 136. When deck obstruction 132 is in the stored position, as shown in FIG. 24, the spring-loaded ball of the plunger 150 protrudes into and/or engages a circumferential groove 152 in the deck obstruction 132 to hold deck obstruction 132 at the stored position. The ball plunger 150 holds the deck obstruction 132 flush or recessed within the guide member 136, even with moderate deck vibration, to prevent the deck obstruction's end 134 from drifting out of the guide 136 toward the blocking position and striking or engaging the platform 16 during normal operation of the dock leveler 10.

The ball plunger 150 is just one example of a retainer that resists movement of the deck obstruction 132 from the stored position toward the blocking position. The term, "a retainer that resists movement of the deck obstruction from the stored position," refers to one or more parts that help hold the deck obstruction at the stored position. Examples of such a retainer include, but are not limited to, a ball plunger, a detent, a spring, a magnet, a latch, a pawl, a movable cover plate, and various combinations thereof, etc. In some alternate examples, the ball plunger 150 is instead attached to the deck obstruction 132, and the plunger's ball protrudes radially from the deck obstruction 132 to engage an internal circumferential groove in the guide member 136.

In any case, to extend the deck obstruction 132 out from the stored position, the worker 86 first pushes the deck obstruction 132 farther into the guide member 136 (e.g., away from the opening of the guide member 136) to compress the spring 148, as shown in FIG. 25. Next, the worker 86 releases the deck obstruction 132 so that the compression in spring 148 pushes the deck obstruction 132 outward toward the blocking position. The deck obstruction's momentum propels it past the ball plunger 150 to enable the deck obstruction's protruding end 134 to protrude beyond the deck's side plate 38 and extend out from underneath the deck plate 36. This exposes the deck obstruction 132 so that the worker 86 can readily grasp it, as shown in FIG. 26, and manually pull it the remaining distance to the blocking position. In some examples, the groove 152 further serves as a pulling enhancement. In the illustrated example, the head 142 engaging end plate 138 limits how far the deck obstruction 132 can be pulled out or moved outward relative to the guide member 136.

To return or move the deck obstruction 132 the stored position, as shown in FIG. 24, the worker 86 pushes the deck obstruction 132 back until the ball plunger 150 engages the groove 152. In the illustrated example, the spring 148 is relaxed or uncompressed when the deck obstruction 132 is in the stored position, as shown in FIG. 24. For example, in the stored position, the end 144 of the deck obstruction 132 may be spaced away or disengaged from the spring 148. The spring 148 is also relaxed and uncompressed when deck obstruction 132 is in the blocking position, as shown in FIG. 26.

It should be noted that although in some examples when the deck obstruction 132 is in the stored position with the protruding end 134 being completely underneath deck plate 36 and in some cases flush or recessed within the side plate 38 and/or within the guide member 136, the protruding end 134 still provides manually accessible means for manipulating or apparatus to enable accessibility of the deck obstruction 132 between the stored and blocking positions. The expression, "manually accessible means for manipulating the first deck obstruction between the stored position and the blocking position," refers to a feature or apparatus that a person can push, pull, turn or touch in some other manner in order to move the deck obstruction between the stored position and/or the blocking position. In some examples, the groove 152 is omitted and the length of the deck obstruction 132 is shortened such that the ball plunger 150 instead engages the axial end of the deck obstruction to help hold the deck obstruction at the stored position.

In the example shown in FIGS. 27-29, a manually swing-open cover plate 154 (one example of a retainer) holds a spring-loaded deck obstruction 156 within a guide member 158 when deck obstruction 156 is in the stored position, as shown in FIG. 27. To move the deck obstruction 156 to the blocking position shown in FIG. 29, the worker 86 first rotates cover plate 154 about a fastener 160, as shown in FIG. 28. When the cover plate 154 is moved away from an opening of the guide member 158 (e.g., swung in an upward in the orientation of FIG. 28), the compression spring 148, which is in compression in FIG. 27, pushes the deck obstruction 156 at least partially outward in a direction toward the blocking position as shown in FIG. 28. The worker 86 can then grasp and pull a protruding end 162 of the deck obstruction 156 out to the blocking position, as shown in FIG. 29. To return the deck obstruction 156 back to the stored position, the worker 86 pushes the deck obstruction 156 back inside the guide member 158, and closes the cover plate 154 (e.g., moves the cover plate 154 to a position that obstructs the protruding end 162).

Some of the illustrated examples specify the use of a compression spring. In lieu of a compression spring, alternate examples use a tensile spring and/or any other biasing element or apparatus to accomplish an equivalent function of applying spring force to extend a deck obstruction.

At least some of the aforementioned examples include one or more features and/or benefits including, but not limited to, the following:

In some examples, a dock leveler is installable at a loading dock having a platform, where the platform defines a pit having a pit width as measured in a lateral direction, and where the dock leveler includes a deck movable relative to the platform. The deck includes a deck plate, a plurality of support beams, a first side plate and a second side plate. The deck plate has a deck width as measured in the lateral direction. The deck plate has a deck length as measured in a longitudinal direction that is coplanar with the deck plate and perpendicular to the lateral direction. The plurality of support beams are underneath the deck plate and re elongate in the longitudinal direction. The deck plate has an outer perimeter defined by a front edge, a rear edge, a first lateral edge and a second lateral edge, where the front edge extends in the lateral direction and is vertically movable. The rear edge extends in the lateral direction and is proximate the platform. The first lateral edge and the second lateral edge extend in the longitudinal direction between the front edge and the rear edge. The first lateral edge and the second lateral edge are substantially parallel to the longitudinal direction. The first side plate is proximate the first lateral edge and is elongate in the longitudinal direction. The second side plate is proximate the second lateral edge and is elongate in the longitudinal direction. The plurality of support beams is interposed between the first side plate and the second side plate. A first deck obstruction extends underneath the deck plate and is selectively configurable to at least one of a blocking position or a stored position. The first deck obstruction is elongate in the lateral direction. The first deck obstruction has a protruding end. The first side plate is closer to the protruding end when the first deck obstruction is in the stored position than when the first deck obstruction is in the blocking position. The first deck obstruction extends laterally beyond the deck width when the deck obstruction is in the blocking position. The first deck obstruction has a pulling enhancement at the protruding end.

In some examples, the first deck obstruction extends through the first side plate.

In some examples, the first deck obstruction extends laterally beyond the deck width when the first deck obstruction is in the stored position.

In some examples, the pulling enhancement comprises a loop.

In some examples, the first deck obstruction includes a tapered surface at the protruding end, the tapered surface oriented in a downward direction, the tapered surface having both a first portion underneath the deck plate and a second portion extending laterally out from underneath the deck plate when the first deck obstruction is in the stored position.

In some examples, the tapered surface is substantially planar.

In some examples, the tapered surface is curved.

In some examples, a guide member extends laterally from the first side plate to a support beam of the plurality of support beams, the first deck obstruction being in lateral sliding contact with the guide member.

In some examples, a guide member extends laterally between the first side plate and a support beam of the plurality of support beams, the first deck obstruction being in lateral sliding contact with the guide member, the first deck obstruction being rotatably fixed relative to the guide member.

In some examples, a pin-and-slot interface between the first deck obstruction and the guide member to rotatably fix the first deck obstruction relative to the guide member.

In some examples, a second deck obstruction extends underneath the deck plate and is selectively configurable to at least one of a second blocking position or a second stored position. The second deck obstruction is elongate in the lateral direction. The second deck obstruction has a second protruding end. The second side plate is closer to the second protruding end when the second deck obstruction is in the second stored position than when the second deck obstruction is in the second blocking position. The second deck obstruction extends laterally beyond the deck width when the second deck obstruction is in the second blocking position. The second deck obstruction includes a second pulling enhancement at the second protruding end.

In some examples, a linkage couples the second deck obstruction to the first deck obstruction, the linkage to provide a positional relationship between the first deck obstruction and the second deck obstruction such that relative lateral movement of the first deck obstruction and the second deck obstruction is substantially equal in distance and opposite in direction.

In some examples, the first deck obstruction defines a lock-receiving hole extending in a direction substantially perpendicular to the lateral direction.

In some examples, the first deck obstruction is laterally elongate to define a lengthwise centerline of the first deck obstruction, the lengthwise centerline being at an incline that elevates the first protruding end of the first deck obstruction relative to a horizontal reference.

In some examples, the first deck obstruction is elongate in the lateral direction when the first deck obstruction is in the stored position, and the first deck obstruction is elongate in the lateral direction when the first deck obstruction is in the blocking position.

In some examples, the first deck obstruction is movable from the stored position to the blocking position upon the first deck obstruction sliding along a substantially straight line from the stored position to the blocking position.

In some examples, a dock leveler is installable at a loading dock having a platform, the platform defining a pit having a pit width as measured in a lateral direction, where the dock leveler includes a deck movable relative to the platform. The deck includes a deck plate, a plurality of support beams, a first side plate and a second side plate. The deck plate has a deck width as measured in the lateral direction and the deck plate has a deck length as measured in a longitudinal direction that is coplanar with the deck plate and perpendicular to the lateral direction. The plurality of support beams is underneath the deck plate and is elongate in the longitudinal direction. The deck plate has an outer perimeter defined by a front edge, a rear edge, a first lateral edge and a second lateral edge. The front edge extends in the lateral direction and being vertically movable, the rear edge extends in the lateral direction and is proximate the platform, the first lateral edge and the second lateral edge extend in the longitudinal direction between the front edge and the rear edge. The first lateral edge and the second lateral edge are substantially parallel to the longitudinal direction. The first side plate is proximate the first lateral edge and is elongate in the longitudinal direction. The second side plate is proximate the second lateral edge and is elongate in the longitudinal direction. The plurality of support beams is interposed between the first side plate and the second side plate. A first deck obstruction extends underneath the deck plate and is selectively configurable to at least one of a blocking position or a stored position. The first deck obstruction is elongate in the lateral direction. The first deck obstruction has a protruding end. The first side plate is closer to the protruding end when the first deck obstruction is in the stored position than when the first deck obstruction is in the blocking position. The first deck obstruction extends laterally beyond the deck width when the deck obstruction is in the blocking position. A tapered surface at the protruding end faces in a direction having both a laterally outward vector component and a downward vector component, where the laterally outward vector component points from the first side plate and away from the second side plate. The tapered surface has both a first portion underneath the deck plate and a second portion extending laterally out from underneath the deck plate when the first deck obstruction is in the stored position.

In some examples, the tapered surface is substantially planar.

In some examples, the tapered surface is curved.

In some examples, the first deck obstruction extends laterally beyond the deck width when the first deck obstruction is in the stored position.

In some examples, the tapered surface includes both a first portion underneath the deck plate and a second portion extending laterally out from underneath the deck plate when the first deck obstruction is in the stored position.

In some examples, a guide member extends laterally from the first side plate to a support beam of the plurality of support beams, the first deck obstruction being in lateral sliding contact with the guide member.

In some examples, a guide member extends laterally between the first side plate and a support beam of the plurality of support beams, the first deck obstruction being in lateral sliding contact with the guide member, the first deck obstruction having limited freedom of rotation relative to the guide member.

In some examples, the first deck obstruction has limited freedom of rotation is by virtue of a pin-and-slot interface between the first deck obstruction and the guide member.

In some examples, the first deck obstruction is laterally elongate to define a lengthwise centerline of the first deck obstruction, the lengthwise centerline being at an incline that elevates the first protruding end of the first deck obstruction.

In some examples, a method of operating a dock leveler that includes a deck installed within a pit defined by a platform includes raising a front end of the deck above the platform, where the front end is elongate in a lateral direction and the front end extends laterally between a first side and a second side of the deck. The method includes manually pulling a first deck obstruction in the lateral direction out from the first side so that the first deck obstruction extends out over a perimeter of the platform, and lowering the front edge of the deck until the first deck obstruction descends upon and engages the platform.

In some examples, the method includes manually gripping a first protruding end of the first deck obstruction that is exposed after manually pulling the first deck obstruction in the lateral direction out from the first side.

In some examples, the method includes causing the first deck obstruction to slidably laterally retract toward the second side of the deck via relative motion between the deck and the platform.

In some examples, the method includes causing a second deck obstruction to move laterally out from the second side so that the second deck obstruction extends out over a perimeter of the platform via manually pulling the first deck obstruction in the lateral direction out from the first side.

In some examples, a method of operating a dock leveler that includes a deck installed within a pit defined by a platform includes lowering a front end of the deck relative to the platform, where the front end is elongate in a lateral direction, the front edge extends laterally between a first side and a second side of the deck, and the deck has a first deck obstruction protruding laterally from the first side of the deck such that the protruding end of the first deck obstruction extends out over the platform. The method includes causing the first deck obstruction protruding laterally from the first side of the deck to retract toward a stored position by sliding laterally toward the second side of the deck when the protruding first deck obstruction engages the platform.

In some examples, the method includes orientating or facing a tapered surface at the protruding end of the first deck obstruction downwardly toward the platform, the tapered surface having both a first portion underneath a top deck plate of the deck and a second portion extending laterally out from underneath the top deck plate when the first deck obstruction is in the stored position.

In some examples, the tapered surface is substantially planar.

In some examples, the tapered surface is curved.

In some examples, the method includes slidably coupling the first deck obstruction within a guide member extending laterally between the first side and the second side, and providing an anti-rotation apparatus to limit rotation of the first deck obstruction relative to the guide member.

In some examples, the method includes providing a pin-and-slot interface between the first deck obstruction and the guide member to limit rotation of the first deck obstruction relative to the guide member.

In some examples, the method includes mounting the first deck obstruction to the deck at an incline to elevate the protruding end of the first deck obstruction relative to a horizontal reference.

In some examples, a dock leveler installable at a loading dock having a platform, where the platform defines a pit having a pit width as measured in a lateral direction, includes a deck being movable relative to the platform. The deck includes a deck plate, a plurality of support beams, a first side plate and a second side plate. The deck plate has a deck width as measured in the lateral direction and the deck plate has a deck length as measured in a longitudinal direction that is coplanar with the deck plate and perpendicular to the lateral direction. The plurality of support beams is underneath the deck plate and is elongate in the longitudinal direction. The deck plate has an outer perimeter defined by a front edge, a rear edge, a first lateral edge and a second lateral edge. The front edge extends in the lateral direction and is vertically movable, the rear edge extends in the lateral direction and is proximate the platform, and the first lateral edge and the second lateral edge extend in the longitudinal direction between the front edge and the rear edge. The first lateral edge and the second lateral edge are substantially parallel to the longitudinal direction. The first side plate is proximate the first lateral edge and is elongate in the longitudinal direction. The second side plate is proximate the second lateral edge and is elongate in the longitudinal direction. The plurality of support beams is interposed between the first side plate and the second side plate. A deck obstruction extends underneath the deck plate and is selectively configurable to at least one of a blocking position or a stored position. The deck obstruction is elongate in the lateral direction. The deck obstruction has a protruding end that provides manually accessible means to manipulate the deck obstruction between the stored position and the blocking position. The first side plate is closer to the protruding end when the deck obstruction is in the stored position than when the deck obstruction is in the blocking position. The protruding end extends laterally beyond the deck width when the deck obstruction is in the blocking position. The deck obstruction includes a retainer that resists movement of the deck obstruction from the stored position toward the blocking position.

In some examples, the retainer comprises a spring-loaded plunger.

In some examples, a spring to urge the first deck obstruction toward the blocking position, the spring being in a relaxed state when the first deck obstruction is in the stored position, and the spring being in the relaxed state when the first deck obstruction is in the blocking position.

In some examples, the protruding end is completely underneath the deck plate when the deck obstruction is in the stored position.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A dock leveler installable at a loading dock having a platform, the platform defining a pit having a pit width as measured in a lateral direction, the dock leveler comprising:
a deck being movable relative to the platform, the deck including a deck plate, a plurality of support beams, a first side plate and a second side plate, the deck plate having a deck width as measured in the lateral direction, the deck plate having a deck length as measured in a longitudinal direction that is coplanar with the deck plate and perpendicular to the lateral direction, the plurality of support beams being underneath the deck plate and being elongate in the longitudinal direction, the deck plate having an outer perimeter defined by a front edge, a rear edge, a first lateral edge and a second lateral edge, the front edge extending in the lateral direction and being vertically movable, the rear edge extending in the lateral direction and being proximate the platform, the first lateral edge and the second lateral edge extending in the longitudinal direction between the front edge and the rear edge, the first lateral edge and the second lateral edge being substantially parallel to the longitudinal direction, the first side plate being proximate the first lateral edge and being elongate in the longitudinal direction, the second side plate being proximate the second lateral edge and being elongate in the longitudinal direction, the plurality of support beams being interposed between the first side plate and the second side plate; and
a first deck obstruction extending underneath the deck plate and being selectively configurable to at least one of a blocking position or a stored position, the first deck obstruction being elongate in the lateral direction, the first deck obstruction having a protruding end, the first side plate being closer to the protruding end when the first deck obstruction is in the stored position than when the first deck obstruction is in the blocking position, the first deck obstruction extending laterally beyond the deck width when the deck obstruction is in the blocking position, the first deck obstruction having a pulling enhancement at the protruding end to move the deck obstruction between the stored position and the blocking position.

2. The dock leveler of claim 1, wherein the first deck obstruction extends through the first side plate.

3. The dock leveler of claim 1, wherein the first deck obstruction extends laterally beyond the deck width when the first deck obstruction is in the stored position.

4. The dock leveler of claim 1, wherein the pulling enhancement comprises a loop.

5. The dock leveler of claim 1, further comprising a guide member extending laterally from the first side plate to a support beam of the plurality of support beams, the first deck obstruction being in lateral sliding contact with the guide member.

6. The dock leveler of claim 1, further comprising a guide member extending laterally between the first side plate and a support beam of the plurality of support beams, the first deck obstruction being in lateral sliding contact with the guide member, the first deck obstruction being rotatably fixed relative to the guide member.

7. The dock leveler of claim 1, further comprising a second deck obstruction extending underneath the deck plate and being selectively configurable to at least one of a second blocking position or a second stored position, the second deck obstruction being elongate in the lateral direction, the second deck obstruction having a second protruding end, the second side plate being closer to the second protruding end when the second deck obstruction is in the second stored position than when the second deck obstruction is in the second blocking position, the second deck obstruction extending laterally beyond the deck width when the second deck obstruction is in the second blocking position, the second deck obstruction includes a second pulling enhancement at the second protruding end.

8. The dock leveler of claim 7, further comprising a linkage to couple the second deck obstruction to the first deck obstruction, the linkage to provide a positional relationship between the first deck obstruction and the second deck obstruction such that relative lateral movement of the first deck obstruction and the second deck obstruction is substantially equal in distance and opposite in direction.

9. The dock leveler of claim 1, wherein the first deck obstruction defines a lock-receiving hole extending in a direction substantially perpendicular to the lateral direction.

10. The dock leveler of claim 1, wherein the first deck obstruction is laterally elongate to define a lengthwise centerline of the first deck obstruction, the lengthwise centerline being at an incline that elevates the first protruding end of the first deck obstruction relative to a horizontal reference.

11. The dock leveler of claim 1, wherein the first deck obstruction is elongate in the lateral direction when the first deck obstruction is in the stored position, and the first deck obstruction is elongate in the lateral direction when the first deck obstruction is in the blocking position.

12. The dock leveler of claim 1, wherein the first deck obstruction is movable from the stored position to the blocking position upon the first deck obstruction sliding along a substantially straight line from the stored position to the blocking position.

13. The dock leveler of claim 1, wherein the deck obstruction comprising a retainer that resists movement of the deck obstruction from the stored position toward the blocking position.

14. The dock leveler of claim 13, wherein the retainer comprises a spring-loaded plunger.

15. The dock leveler of claim 13, further comprising a spring to urge the first deck obstruction toward the blocking position, the spring being in a relaxed state when the first deck obstruction is in the stored position, and the spring being in the relaxed state when the first deck obstruction is in the blocking position.

16. The dock leveler of claim 13, wherein the protruding end is completely underneath the deck plate when the deck obstruction is in the stored position.

17. The dock leveler of claim 1, wherein the first deck obstruction includes a tapered surface adjacent the protruding end.

18. The dock leveler of claim 17, wherein the tapered surface is oriented in a downward direction, the tapered surface having both a first portion underneath the deck plate and a second portion extending laterally out from underneath the deck plate when the first deck obstruction is in the stored position.

19. A dock leveler installable at a loading dock having a platform, the platform defining a pit having a pit width as measured in a lateral direction, the dock leveler comprising:
    a deck being movable relative to the platform, the deck including a deck plate, a plurality of support beams, a first side plate and a second side plate, the deck plate having a deck width as measured in the lateral direction, the deck plate having a deck length as measured in a longitudinal direction that is coplanar with the deck plate and perpendicular to the lateral direction, the plurality of support beams being underneath the deck plate and being elongate in the longitudinal direction, the deck plate having an outer perimeter defined by a front edge, a rear edge, a first lateral edge and a second lateral edge, the front edge extending in the lateral direction and being vertically movable, the rear edge extending in the lateral direction and being proximate the platform, the first lateral edge and the second lateral edge extending in the longitudinal direction between the front edge and the rear edge, the first lateral edge and the second lateral edge being substantially parallel to the longitudinal direction, the first side plate being proximate the first lateral edge and being elongate in the longitudinal direction, the second side plate being proximate the second lateral edge and being elongate in the longitudinal direction, the plurality of support beams being interposed between the first side plate and the second side plate; and
    a first deck obstruction extending underneath the deck plate and being selectively configurable to at least one of a blocking position or a stored position, the first deck obstruction being elongate in the lateral direction, the first deck obstruction having a protruding end, the first side plate being closer to the protruding end when the first deck obstruction is in the stored position than when the first deck obstruction is in the blocking position, the first deck obstruction extending laterally beyond the deck width when the deck obstruction is in the blocking position, the first deck obstruction having a pulling enhancement at the protruding end, the first deck obstruction including a tapered surface at the protruding end, the tapered surface oriented in a downward direction, the tapered surface having both a first portion underneath the deck plate and a second portion extending laterally out from underneath the deck plate when the first deck obstruction is in the stored position.

20. The dock leveler of claim 19, wherein the tapered surface is substantially planar.

21. The dock leveler of claim 19, wherein the tapered surface is curved.

22. A dock leveler installable at a loading dock having a platform, the platform defining a pit having a pit width as measured in a lateral direction, the dock leveler comprising:
    a deck being movable relative to the platform, the deck including a deck plate, a plurality of support beams, a first side plate and a second side plate, the deck plate having a deck width as measured in the lateral direction, the deck plate having a deck length as measured in a longitudinal direction that is coplanar with the deck plate and perpendicular to the lateral direction, the plurality of support beams being underneath the deck plate and being elongate in the longitudinal direction, the deck plate having an outer perimeter defined by a front edge, a rear edge, a first lateral edge and a second lateral edge, the front edge extending in the lateral direction and being vertically movable, the rear edge extending in the lateral direction and being proximate the platform, the first lateral edge and the second lateral edge extending in the longitudinal direction between the front edge and the rear edge, the first lateral edge and the second lateral edge being substantially parallel to the longitudinal direction, the first side plate being proximate the first lateral edge and being elongate in the longitudinal direction, the second side plate being proximate the second lateral edge and being elongate in the longitudinal direction, the plurality of support beams being interposed between the first side plate and the second side plate;
    a first deck obstruction extending underneath the deck plate and being selectively configurable to at least one of a blocking position or a stored position, the first deck obstruction being elongate in the lateral direction, the first deck obstruction having a protruding end, the first side plate being closer to the protruding end when the first deck obstruction is in the stored position than when the first deck obstruction is in the blocking position, the first deck obstruction extending laterally beyond the deck width when the deck obstruction is in the blocking position, the first deck obstruction having a pulling enhancement at the protruding end;
    a guide member extending laterally between the first side plate and a support beam of the plurality of support beams, the first deck obstruction being in lateral sliding contact with the guide member, the first deck obstruction being rotatably fixed relative to the guide member; and a pin-and-slot interface between the first deck obstruction and the guide member to rotatably fix the first deck obstruction relative to the guide member.

23. A dock leveler installable at a loading dock having a platform, the platform defining a pit having a pit width as measured in a lateral direction, the dock leveler comprising:
a deck being movable relative to the platform, the deck including a deck plate, a plurality of support beams, a first side plate and a second side plate, the deck plate having a deck width as measured in the lateral direction, the deck plate having a deck length as measured in a longitudinal direction that is coplanar with the deck plate and perpendicular to the lateral direction, the plurality of support beams being underneath the deck plate and being elongate in the longitudinal direction, the deck plate having an outer perimeter defined by a front edge, a rear edge, a first lateral edge and a second lateral edge, the front edge extending in the lateral direction and being vertically movable, the rear edge extending in the lateral direction and being proximate the platform, the first lateral edge and the second lateral edge extending in the longitudinal direction between the front edge and the rear edge, the first lateral edge and the second lateral edge being substantially parallel to the longitudinal direction, the first side plate being proximate the first lateral edge and being elongate in the longitudinal direction, the second side plate being proximate the second lateral edge and being elongate in the longitudinal direction, the plurality of support beams being interposed between the first side plate and the second side plate; and
a first deck obstruction extending underneath the deck plate and being selectively configurable to at least one of a blocking position or a stored position, the first deck obstruction being elongate in the lateral direction, the first deck obstruction having a protruding end, the first side plate being closer to the protruding end when the first deck obstruction is in the stored position than when the first deck obstruction is in the blocking position, the first deck obstruction extending laterally beyond the deck width when the deck obstruction is in the blocking position; and
a tapered surface at the protruding end, the tapered surface facing in a direction having both a laterally outward vector component and a downward vector component, the laterally outward vector component pointing from the first side plate and away from the second side plate, the tapered surface having both a first portion underneath the deck plate and a second portion extending laterally out from underneath the deck plate when the first deck obstruction is in the stored position.

24. The dock leveler of claim 23, wherein the tapered surface is substantially planar.

25. The dock leveler of claim 23, wherein the tapered surface is curved.

26. The dock leveler of claim 23, wherein the first deck obstruction extends laterally beyond the deck width when the first deck obstruction is in the stored position.

27. The dock leveler of claim 23, wherein the tapered surface includes both a first portion underneath the deck plate and a second portion extending laterally out from underneath the deck plate when the first deck obstruction is in the stored position.

28. The dock leveler of claim 23, further comprising a guide member extending laterally from the first side plate to a support beam of the plurality of support beams, the first deck obstruction being in lateral sliding contact with the guide member.

29. The dock leveler of claim 23, further comprising a guide member extending laterally between the first side plate and a support beam of the plurality of support beams, the first deck obstruction being in lateral sliding contact with the guide member, the first deck obstruction having limited freedom of rotation relative to the guide member.

30. The dock leveler of claim 29, wherein the first deck obstruction having limited freedom of rotation is by virtue of a pin-and-slot interface between the first deck obstruction and the guide member.

31. The dock leveler of claim 23, wherein the first deck obstruction is laterally elongate to define a lengthwise centerline of the first deck obstruction, the lengthwise centerline being at an incline that elevates the first protruding end of the first deck obstruction.

* * * * *